United States Patent
Bowden et al.

(10) Patent No.: US 8,783,002 B2
(45) Date of Patent: *Jul. 22, 2014

(54) METHOD FOR PROVIDING A REGULATED ATMOSPHERE FOR PACKAGING PERISHABLE GOODS

(71) Applicant: The Bowden Group, Honolulu, HI (US)

(72) Inventors: Lisa A. Bowden, Honolulu, HI (US); R. Craig Bowden, Honolulu, HI (US); James Nagamine, Watsonville, CA (US)

(73) Assignee: The Bowden Group, Honolulu, HI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/839,460

(22) Filed: Mar. 15, 2013

(65) Prior Publication Data

US 2013/0205717 A1    Aug. 15, 2013

Related U.S. Application Data

(63) Continuation-in-part of application No. 13/602,988, filed on Sep. 4, 2012, now Pat. No. 8,683,776, which is (Continued)

(51) Int. Cl.
*B65B 31/04* (2006.01)
*B65B 55/00* (2006.01)
*B65B 25/04* (2006.01)
*A23L 3/3418* (2006.01)

(52) U.S. Cl.
CPC ............. *A23L 3/3418* (2013.01); *B65B 25/041* (2013.01); *B65B 31/04* (2013.01); *B65B 55/00* (2013.01)
USPC ................... 53/400; 53/431; 53/432; 53/440; 53/449; 53/461; 426/316; 426/324; 426/326

(58) Field of Classification Search
CPC .... A23L 3/3418; B65B 25/04; B65B 25/041; B65B 55/00; B65B 31/08; B65B 31/06; B65B 31/04

USPC ........... 53/399, 400, 428, 431–434, 440, 441, 53/449, 461, 465, 510–512, 127, 176, 556, 53/587, 588, 211; 206/213.1, 386, 524.8, 206/597; 426/316, 324, 326, 395, 396, 418, 426/419
IPC ........................ B65B 31/04,31/06, 31/08, 55/00
See application file for complete search history.

(56) References Cited

U.S. PATENT DOCUMENTS 2,445,152 A    7/1948  Poole
3,429,095 A    2/1969  Huson
(Continued)

FOREIGN PATENT DOCUMENTS

EP    150554 A1    8/1985
EP    156012 A1    10/1985
(Continued)

OTHER PUBLICATIONS

European Office Action issued in European Application No. 08253536 dated Apr. 21, 2011, 4 pages.

(Continued)

*Primary Examiner* — Stephen F Gerrity
(74) *Attorney, Agent, or Firm* — Venable LLP

(57) ABSTRACT

A method for introducing at least one substance into a sealed enclosure holding at least one product. At least one conduit may be provided through which one of gas or fluid may flow into or out of the sealed enclosure. Air may be evacuated from the sealed enclosure through the at least one conduit to create a predetermined pressure within the sealed enclosure and a predetermined quantity of the at least one substance may be injected into the sealed enclosure through the at least one conduit.

24 Claims, 22 Drawing Sheets

Related U.S. Application Data a continuation of application No. 11/932,611, filed on Oct. 31, 2007, now Pat. No. 8,256,190, which is a continuation-in-part of application No. 10/336,962, filed on Jan. 6, 2003, now Pat. No. 7,644,560, which is a continuation-in-part of application No. 10/000,211, filed on Oct. 22, 2001, now Pat. No. 6,685,012, which is a continuation-in-part of application No. 09/393,047, filed on Sep. 9, 1999, now Pat. No. 6,305,148.

(60) Provisional application No. 60/099,728, filed on Sep. 10, 1998.

(56) References Cited

U.S. PATENT DOCUMENTS

| | | | | |
|---|---|---|---|---|
| 3,597,235 | A | 8/1971 | Kramer | |
| 3,640,048 | A | 2/1972 | Zelnick et al. | |
| 3,715,860 | A | 2/1973 | Esty | |
| 3,756,396 | A | 9/1973 | Kilroy | |
| 3,850,214 | A | 11/1974 | Hickey | |
| 3,939,287 | A | 2/1976 | Orwig et al. | |
| 4,000,815 | A | 1/1977 | Wingbro et al. | |
| 4,055,931 | A | 11/1977 | Myers | |
| 4,066,401 | A | 1/1978 | Solomon | |
| 4,114,668 | A | 9/1978 | Hickey | |
| 4,121,732 | A | 10/1978 | Hickey | |
| 4,149,578 | A | 4/1979 | Hickey | |
| 4,224,347 | A | 9/1980 | Woodruff | |
| 4,243,349 | A | 1/1981 | Hickey et al. | |
| 4,356,702 | A | 11/1982 | Kuttel | |
| 4,411,918 | A | 10/1983 | Cimino et al. | |
| 4,422,304 | A | 12/1983 | Kuttel | |
| 4,502,519 | A | 3/1985 | Clements | |
| 4,537,043 | A * | 8/1985 | Volker et al. | 62/239 |
| 4,575,989 | A | 3/1986 | Hannen | |
| 4,729,671 | A | 3/1988 | Asano et al. | |
| 4,821,489 | A | 4/1989 | MacLeod et al. | |
| 4,843,956 | A | 7/1989 | Lashlee | |
| 4,886,372 | A | 12/1989 | Greengrass et al. | |
| 4,894,997 | A | 1/1990 | Urushizaki et al. | |
| 4,911,317 | A | 3/1990 | Schloesser et al. | |
| 4,966,755 | A | 10/1990 | Smith | |
| 4,987,745 | A | 1/1991 | Harris | |
| 4,996,071 | A | 2/1991 | Bell | |
| 5,016,761 | A | 5/1991 | Stoddard et al. | |
| 5,028,443 | A | 7/1991 | Wade | |
| 5,046,302 | A | 9/1991 | Bolejack et al. | |
| 5,077,009 | A | 12/1991 | Subotics et al. | |
| 5,111,639 | A | 5/1992 | Bolejack et al. | |
| 5,156,009 | A | 10/1992 | Woodruff | |
| 5,236,099 | A | 8/1993 | Fties et al. | |
| 5,238,648 | A | 8/1993 | Kremen | |
| 5,251,753 | A | 10/1993 | Pigott et al. | |
| 5,277,031 | A | 1/1994 | Miller et al. | |
| 5,314,286 | A | 5/1994 | Bolejack et al. | |
| 5,316,178 | A | 5/1994 | Garber, Jr. | |
| 5,333,394 | A | 8/1994 | Herdeman et al. | |
| 5,354,569 | A | 10/1994 | Brown et al. | |
| 5,437,837 | A * | 8/1995 | Olson et al. | 422/3 |
| 5,458,899 | A | 10/1995 | Floyd et al. | |
| 5,474,082 | A | 12/1995 | Junker | |
| 5,497,698 | A | 3/1996 | Bolkestein | |
| 5,505,950 | A | 4/1996 | Floyd et al. | |
| 5,544,472 | A | 8/1996 | Koskinen et al. | |
| 5,560,947 | A | 10/1996 | Bell | |
| 5,609,096 | A * | 3/1997 | Kwon et al. | 99/468 |
| 5,658,607 | A | 8/1997 | Herdeman | |
| 5,718,118 | A * | 2/1998 | Eisele | 62/78 |
| 5,732,535 | A | 3/1998 | Mitsuta | |
| 5,738,890 | A | 4/1998 | Cadiente et al. | |
| 5,747,082 | A | 5/1998 | Floyd et al. | |
| 5,791,236 | A * | 8/1998 | Schouten | 99/468 |
| 5,806,282 | A | 9/1998 | Hansen | |
| 5,822,951 | A | 10/1998 | Rosik | |
| 5,872,721 | A * | 2/1999 | Huston et al. | 702/24 |
| 5,945,147 | A | 8/1999 | Borchard | |
| 5,950,402 | A | 9/1999 | Hoddinott | |
| 6,012,471 | A | 1/2000 | Calvin et al. | |
| 6,092,430 | A | 7/2000 | Liston et al. | |
| 6,203,833 | B1 * | 3/2001 | Yang et al. | 426/310 |
| 6,234,473 | B1 | 5/2001 | Morgan et al. | |
| 6,256,905 | B1 * | 7/2001 | White | 34/467 |
| 6,305,148 | B1 | 10/2001 | Bowden et al. | |
| 6,615,908 | B1 | 9/2003 | Bosher et al. | |
| 7,208,187 | B2 | 4/2007 | Gabler | |
| 7,228,793 | B2 * | 6/2007 | Ling et al. | 99/468 |
| 7,644,560 | B2 * | 1/2010 | Bowden et al. | 53/432 |
| 8,256,190 | B2 | 9/2012 | Bowden et al. | |
| 2002/0096558 | A1 * | 7/2002 | Shapiro | 229/107 |
| 2002/0164407 | A1 * | 11/2002 | Wolfe et al. | 426/393 |
| 2003/0182900 | A1 | 10/2003 | Bowden et al. | |

FOREIGN PATENT DOCUMENTS

| | | |
|---|---|---|
| FR | 2552731 A1 | 4/1985 |
| FR | 2653407 A1 | 4/1991 |
| JP | 60-118145 | 6/1985 |
| JP | 60-217858 | 10/1985 |
| JP | 64-84822 A | 3/1989 |
| JP | 1-112945 A | 5/1989 |
| JP | 1-137950 A | 5/1989 |
| JP | 2-296625 A | 12/1990 |
| WO | WO-94/05550 A1 | 3/1994 |

OTHER PUBLICATIONS

International Search Report for PCT/US1999/26566 dated Feb. 28, 2000, 2 pages.
Office Action issued in U.S. Appl. No. 13/602,988 dated Nov. 21, 2012.
Office Action issued in U.S. Appl. No. 11/932,611 dated Jan. 26, 2009.
Office Action issued in U.S. Appl. No. 11/932,611 dated Sep. 3, 2009.
Office Action issued in U.S. Appl. No. 11/932,611 dated Dec. 28, 2009.
Office Action issued in U.S. Appl. No. 11/932,611 dated Jan. 28, 2011.
Office Action issued in U.S. Appl. No. 11/932,611 dated Sep. 7, 2011.
Notice of Allowance issued in U.S. Appl. No. 11/932,611 dated May 4, 2012.
Office Action issued in U.S. Appl. No. 10/336,962 dated Feb. 24, 2004.
Office Action issued in U.S. Appl. No. 10/336,962 dated Sep. 23, 2004.
Notice of Allowance issued in U.S. Appl. No. 10/336,962 dated May 16, 2005.
Office Action issued in U.S. Appl. No. 10/336,962 dated Sep. 9, 2005.
Office Action issued in U.S. Appl. No. 10/336,962 dated Mar. 23, 2006.
Office Action issued in U.S. Appl. No. 10/336,962 dated Dec. 19, 2006.
Office Action issued in U.S. Appl. No. 10/336,962 dated Jun. 4, 2007.
Office Action issued in U.S. Appl. No. 10/336,962 dated Dec. 28, 2007.
Office Action issued in U.S. Appl. No. 10/336,962 dated Mar. 9, 2009.
Notice of Allowance issued in U.S. Appl. No. 10/336,962 dated Aug. 31, 2009.

* cited by examiner

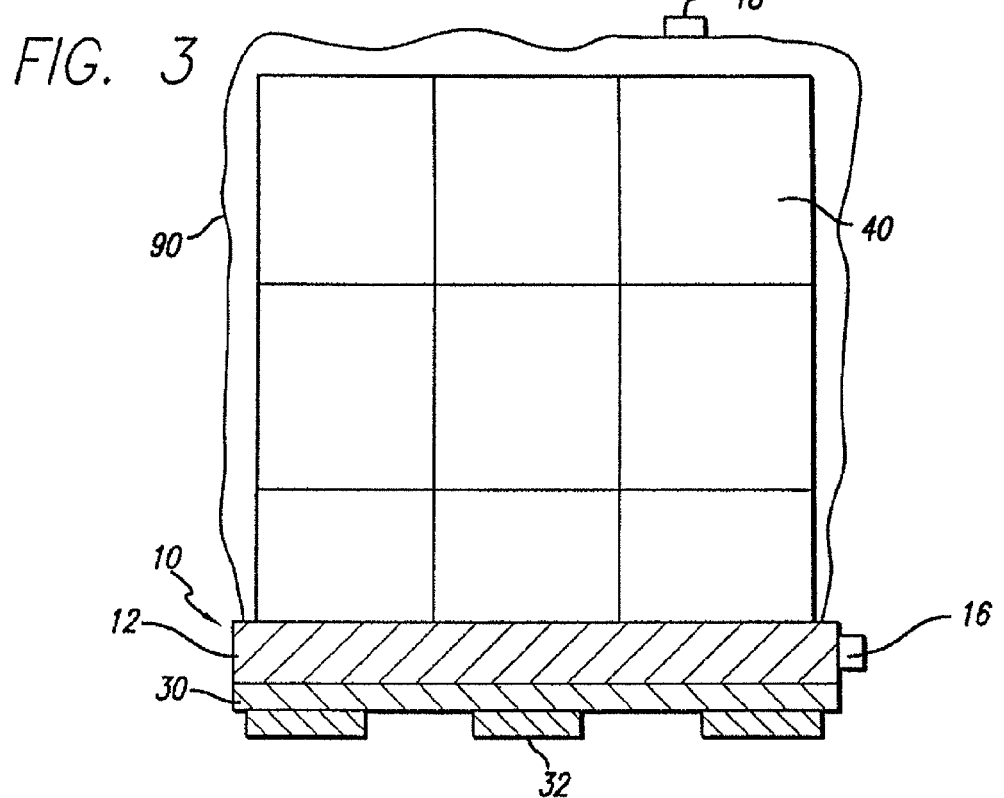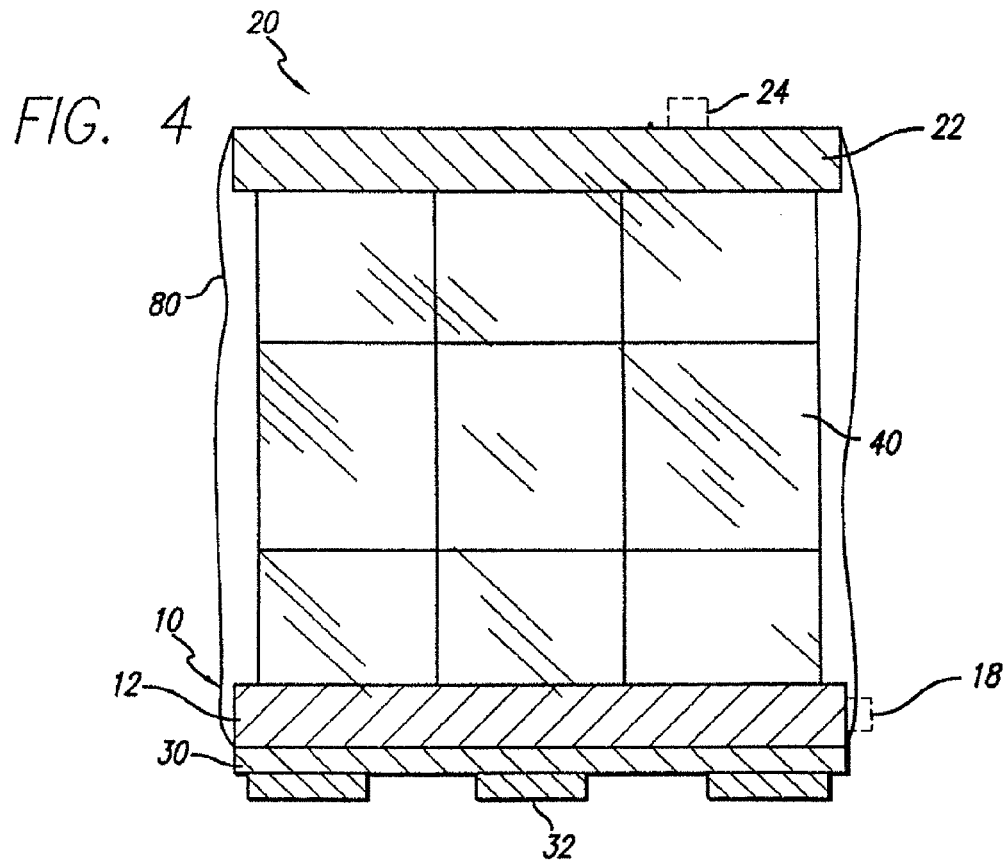

BAGGED AND WRAPPED
WITH BOTTOM SHEET ONLY

"WRAPPED ONLY" WITH
TOP AND BOTTOM SHEET

MULTI-ZONE CONTROLLER

SINGLE-ZONE CONTROLLER

METHOD FOR PROVIDING A REGULATED ATMOSPHERE FOR PACKAGING PERISHABLE GOODS

CROSS REFERENCE TO RELATED APPLICATIONS

This application is a continuation-in-part of U.S. patent application Ser. No. 13/602,988, filed Sep. 4, 2012, which is a continuation of U.S. patent application Ser. No. 11/932,611, filed on Oct. 31, 2007, now U.S. Pat. No. 8,256,190, issued Sep. 4, 2012, which is a continuation-in-part of U.S. patent application Ser. No. 10/336,962, filed on Jan. 6, 2003, now U.S. Pat. No. 7,644,560, issued Jan. 12, 2010, which is a continuation-in-part of U.S. patent application Ser. No. 10/000,211, filed on Oct. 22, 2001, now U.S. Pat. No. 6,685,012, issued Feb. 3, 2004, which is a divisional of U.S. patent application Ser. No. 09/393,047, filed Sep. 9, 1999, now U.S. Pat. No. 6,305,148, granted Oct. 23, 2001. Each of the foregoing U.S. patent applications claims priority under 35 U.S.C. §119(e) from U.S. Provisional Application No. 60/099,728, filed Sep. 10, 1998, entitled "System and Method Providing a Regulated Atmosphere for Packaging Perishable Goods." Each of the foregoing U.S. patent applications is hereby incorporated by reference in its entirety.

FIELD OF THE INVENTION

The present invention relates to a method and apparatus for creating a sealed enclosure around perishable or atmosphere-sensitive products for transport or storage. More particularly, the invention relates to a storage method and system for enclosing goods being transported, on a pallet, for example, providing a desired environment or atmosphere within the enclosure, and optionally monitoring and controlling the environment or atmosphere within the enclosure during transport. The present invention further relates to methods and systems for the introduction of sanitizing, flavoring, preserving, and other substances into sealed enclosures containing products such as perishable food products.

BACKGROUND OF THE INVENTION

Perishable or environmentally sensitive goods risk damage from numerous sources such as wind, dirt, heat, insects, etc. during transportation. Various forms of packaging have been used to minimize damage or decay of such goods. For example, goods are often secured to a pallet to facilitate the transport of such goods and to protect the goods from damage caused by shifting during transport. In order to further protect and preserve the goods during transport, it is well known to cover the goods so as to form an enclosure around the goods. Known techniques to create an enclosure include heat shrinking plastic around the goods which has been placed on a pallet or placing a plastic bag around the goods on a pallet. By forming such an enclosure, referred to as a "sealed enclosure" herein, the goods can be protected from environmental factors such as moisture or other contaminants. The more airtight the sealed enclosure, the better the sealed enclosure protects the goods from external contaminants.

FIG. 1 shows a well-known apparatus 50 for storing goods during transport. The apparatus 50 includes a base cap 10 positioned over a pallet 30. After the base cap is positioned on the pallet 30, the base cap 10 is usually held in place by the goods 40 that are stacked on top of the base cap 10. The base cap 10 further includes side flaps or walls 12 which extend upwardly from the peripheral edges of the base cap 10, for surrounding and holding the goods 40 within their boundaries. Typically, the goods 40 are then further secured to the base cap 10 and the pallet 30 with staples or some type of tape that wraps around the goods 40 and the base cap 10.

The base cap 10 forms a barrier between the goods 40 and the pallet 30 and is typically made from some type of plastic, relatively impermeable material shaped to fit over the pallet 30. The base cap 10 seals and protects the bottom surface of the goods 40 from contamination and also provides a surface to which the goods 40 can be secured. The base cap 10 can be any shape or material, but is preferably sized to cover the pallet 30 and preferably made of a relatively water and gas impermeable material to form a seal barrier at the underside of the goods 40. Goods 40 are stacked on the base cap 10 which is placed on top of the pallet 30. The goods 40 can be a variety of types or sizes and preferably are in boxes or containers. While three layers of boxed goods 40 are shown, there can be more or less layers. The combination of stacked goods 40 on the base cap and the pallet 30, as illustrated in FIG. 1, is referred to herein as the loaded pallet 50.

FIG. 2 illustrates a well-known method of creating a sealed enclosure around the loaded pallet 50 of FIG. 1. A bag-like covering 90 is placed around the goods 40 and secured to the base cap 10 of the loaded pallet 50, thereby forming a sealed enclosure around the goods 40. Preferably, the bag covering 90 is adhered to the base cap 10 and the pallet 30 with tape, or other well-known technique, to create an air-tight seal.

Prior art enclosure systems, such as those discussed above, suffer from many disadvantages. Using a bag covering 90 to form the enclosure, as shown in FIG. 2, is disadvantageous in that it is difficult to seal the bottom end of the cover 90 with the base cap 10. The bag covering 90 is often larger than the base cap 10, so sealing the bag covering 90 to the base cap 10 requires folding and creasing of the bag covering 90. The folding and creasing of the bag covering 90 to fit the base cap 10 prevents a smooth contact between the inside surface of the bag covering 90 and outside edges of the base cap 10. Furthermore, the folds and creases form possible gaps or channels for gases to bypass the seal, thus, preventing an airtight enclosure.

Likewise, when wrapping plastic around palletized goods, it is difficult to completely seal the enclosure, especially at the top and bottom sides. The wrapping must curve around the corners and edges of goods 40, leading to potential gaps or creases in the wrapping. As previously discussed, the gaps and creases are undesirable in that they provide possible channels for air to escape or enter the sealed enclosure.

After the goods 40 have been loaded onto the pallet 30 and sealed by some method, such as by covering 90 and base cap 10 as described above, the goods 40 can be further protected and preserved by providing a modified atmosphere inside the enclosure surrounding the goods 40. For example, it is well known to inject gases such as nitrogen and carbon dioxide within the enclosure in order to deter deterioration of the goods, for example, by the growth of organisms that may contribute to the natural deterioration of produce. Other mixtures of gases can help maintain the goods 40 if held at an appropriate temperature and humidity.

Good sealed enclosures are especially important in these modified air systems. If the sealed enclosure leaks, the beneficial gases may escape. Furthermore, a change in the composition of gases in the enclosure may damage the goods. For example, an excessive amount of $CO_2$ in the enclosure may cause food to discolor and to change taste.

The predominant present technique for introducing the modified atmosphere into the sealed enclosure is to inject the gas mixture through a needle-tipped hose. The needle-tipped hose is inserted through the covering of a sealed enclosure (such as bag covering 90 in FIG. 2). The needle-tipped hose is then taped to the covering and a desired gas mixture is injected through the hose into the sealed enclosure. The process ends by removal of the needle-tipped hose from the enclosure and re-sealing of the resulting hole in the covering with tape or other adhesive.

This present system for introducing the modified atmosphere into the sealed enclosure is disadvantageous. The steps of manually piercing the enclosure to insert the needle hose and resealing the resulting hole are labor extensive, adding cost and delays to the shipping process. The process of piercing and resealing the enclosure is also undesirable in that it may create a potential leak in the enclosure. The tape or adhesive may not seal properly, creating leaks in the sealed enclosure.

Another disadvantage of the present enclosed pallet transport systems is that they do not allow the user to monitor and adjust the atmosphere within the sealed enclosure during storage or transport. A typical result of this shortcoming is that the atmosphere deteriorates during storage or transport. For example, respiration to produce will accelerate the ripening and aging of produce during transport and will change the quality of the gases in the enclosure. As a result, the goods may deteriorate during transport, especially if delayed by unforeseen circumstances.

Furthermore, the transporter cannot adjust the atmosphere to accommodate a good with varying needs. For example, the ripening of fruits is generally undesirable during transport and storage but may be desirable as the fruits near their final markets. It is well known that certain combinations of gases prevent the ripening of fruits while others encourage the fruits to ripen. Thus it is desirable to have the enclosure containing the former gas mixture during most of transport, but changing to the latter gas mixture as the fruits near their final markets.

It is also known to be beneficial to provide a controlled environment around the goods 49 during transportation and storage. For example, the goods 40 can be transported in refrigerated trucks, ships, or railcars. Within the cargo holding area of specialized transport vehicles, the temperature or atmospheric contents around the goods can be adjusted and controlled during transport. However, transportation of goods by these environment controlling vehicles has several problems. Foremost, most transport vehicles do not have the ability to control the atmospheric environment of the cargo holding area. For example, most trucks have the capacity to only maintain the cool temperature of their cargo. Environmental control requires additional specialized equipment and this specialized equipment significantly raises the costs for the transport vehicle, ship or storage facility. As a result, there are not enough environment controlling vehicles to transport goods. Transportation of a larger range of goods in controlled environments could provide significant benefits to the consumer by reducing loss of goods during transport.

A further disadvantage of current vehicles having a combined temperature and controlled atmosphere enclosure is the dehydration of products during storage (due to evaporation through cooling). Much energy is required to cool a large enclosure. The energy consumption raises fuel and transportation costs and the negative affects of product dehydration and weight loss due to relative vapor pressure on unprotected produce may be significant.

Thus, in view of the deficiencies and problems associated with prior art methods and systems for storing and transporting perishable or environment-sensitive goods, an improved method and system of transporting such goods is needed. A method and system for more easily and efficiently creating a sealed enclosure around the perishable goods is desired. What is further needed is a method and system which can provide, monitor and/or maintain a controlled environment within the sealed enclosure of a standard pallet, bin or other shipping unit without the use of expensive, specialized vehicles having atmosphere-controlled cargo holds, such as ships, specialized sea containers, and refrigerated trucks, for example.

Additionally, improved methods and systems for effectively and efficiently introducing substances such as sanitizing, flavoring, and preserving substances into sealed enclosures containing products such as perishable products are needed.

SUMMARY OF THE INVENTION

The present invention alleviates many of the disadvantages of known apparatus and methods for transporting perishable goods by providing an apparatus and method for creating a sealed enclosure around perishable goods stacked on a pallet, bin, or storage unit and further providing a method and apparatus for establishing and maintaining a protective atmosphere within the sealed pallet, bin or storage unit enclosure.

In one embodiment, a method for providing a desired atmosphere within a sealed enclosure may be provided. At least one product may be disposed within the sealed enclosure. The method may include: evacuating air from the sealed enclosure through at least one conduit to create a first predetermined pressure within the sealed enclosure and injecting a predetermined quantity of at least one substance into the sealed enclosure through the at least one conduit. The evacuating and injecting may be controlled by a controller programmed with target parameters, set-points and/or operating instructions to provide a desired atmosphere within the sealed enclosure. The method may include monitoring the atmosphere inside the sealed enclosure by sampling the atmosphere and comparing at least one sampled parameter to the target parameters, set-points and/or operating instructions and maintaining and/or adjusting the atmosphere inside the sealed enclosure based on the monitoring, wherein the maintaining and/or adjusting of the atmosphere is controlled by the controller in accordance with target parameters, set-points and/or operating instructions.

In another embodiment, the at least one substance may comprises at least one of a sanitizing substance, a flavoring substance, a preservative substance, a food additive substance, a coating substance, a coloring substance, a nutritional substance, a sealing substance, a mineral substance, a vitamin substance, an essence and/or essential oil substance, or a biological substance.

In another embodiment, each of the methods and systems, described above, further includes a sensor, for measuring and/or monitoring the atmosphere or pressure within the enclosure, and a controller (e.g., a programmable logic controller) for controlling the amount of desired gases introduced into the sealed enclosure. The amount of select gas present in, or introduced into, the enclosure is monitored and/or measured by the sensor which is in turn coupled to the controller, or other well-known processor. By receiving data from the sensor, the controller may either open or close the valve to either start or stop the inflow of gas from the gas tanks into the enclosure. Optionally, the controller may be disconnected from the sealed enclosure after an initial desired atmosphere is achieved, or the controller can remain attached to the system during storage or transportation so as to continually monitor and maintain the desired atmosphere throughout the duration of the trip or storage period.

A further aspect of the present application provides for a method for introducing at least one substance, comprising positioning at least one product within a sealed enclosure, the sealed enclosure having at least one conduit through which one of gas or fluid may flow into or out of the sealed enclosure, evacuating air from the sealed enclosure through the at least one conduit to create a predetermined pressure within the sealed enclosure, and injecting a predetermined quantity of the at least one substance into the sealed enclosure through the at least one conduit.

A further aspect of the present application provides for a method for introducing at least one substance, comprising positioning at least one product within a sealed enclosure, the sealed enclosure having at least one conduit through which one of gas or fluid may flow into or out of the sealed enclosure, evacuating air from the sealed enclosure until a first value of pressure is created within the sealed enclosure, maintaining the first value of pressure within the sealed enclosure for a first predetermined period of time, introducing air into the sealed enclosure until a second value of pressure is created within the sealed enclosure, the air containing a predetermined quantity of the at least one substance, maintaining the second value of pressure within the sealed enclosure for a second predetermined period of time, evacuating the air from the sealed enclosure until a third value of pressure is created within the sealed enclosure, and maintaining the third value of pressure within the sealed enclosure for a third predetermined period of time.

BRIEF DESCRIPTION OF THE DRAWINGS

FIG. 3 illustrates a perspective view of a sealed enclosure formed by a base cap, a bag-like covering and at least one valve coupled to the base cap, in accordance with one embodiment of the invention. Optionally, at least one valve may be incorporated into the covering in addition to, or alternatively to, at least one valve coupled to the base cap.

FIG. 4 illustrates a perspective view of a sealed enclosure formed by a base cap, a top cap and a side wrapping which adheres to the base and top caps in accordance with one embodiment of the invention.

DETAILED DESCRIPTION

Figure 1:
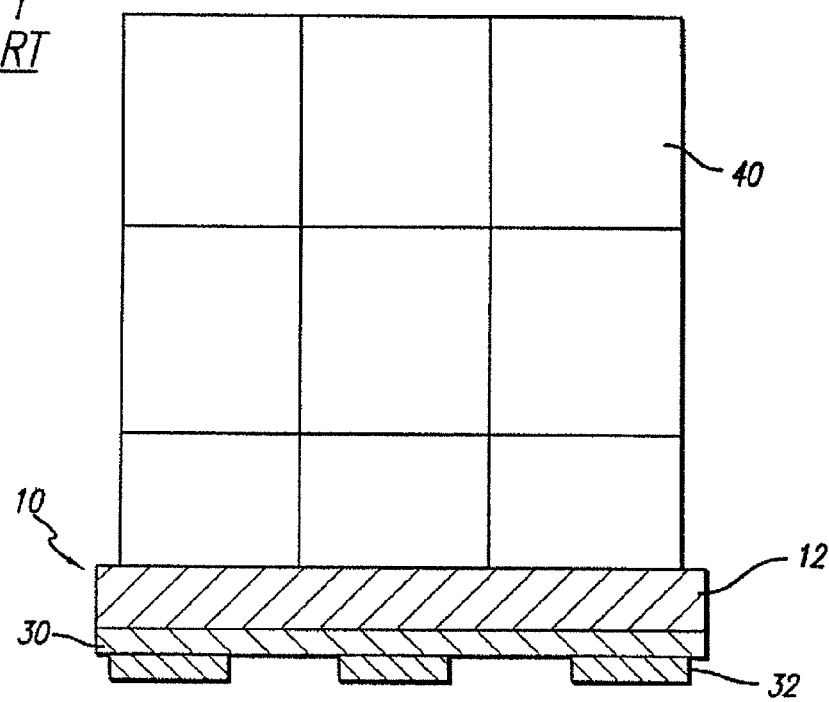
FIG. 1 illustrates a prior art method and system of packaging goods on a pallet by placing a base cap between the goods and the pallet.
Figure 2:
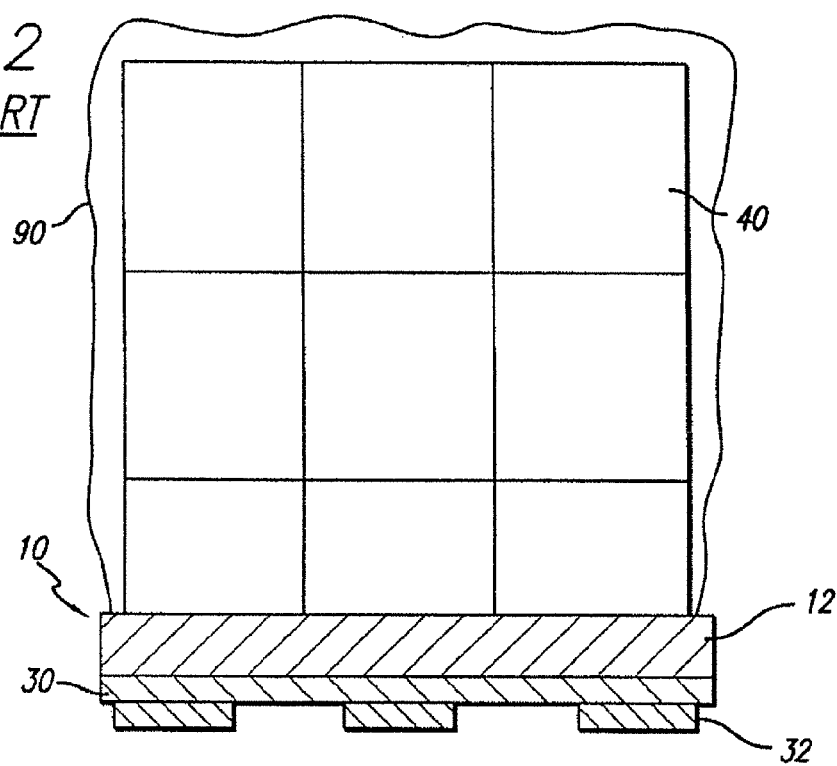
FIG. 2 illustrates a prior art sealed enclosure created by a covering positioned over the goods and attached to the base cap of FIG. 1.

The invention is described in detail below with reference to the figures, wherein like elements are referred to with like numerals throughout. In accordance with the present invention, a method and apparatus for creating a sealed enclosure around perishable or atmosphere-sensitive products for storage and transport (e.g., palletized goods), introducing a desired atmosphere into the sealed enclosure, and optionally maintaining a controlled atmosphere within the enclosure during transportation of the goods, is provided.

FIG. 3 illustrates a side perspective view of one embodiment of the invention that includes a base cap 10 positioned on top of a pallet 30. As shown in FIG. 3, the pallet 30 typically includes lifters or pegs 32, which raise the bottom surface of the pallet 30 off the ground. This keeps the goods 40 away from contaminants that may be on the ground and further facilitates machinery, such as a forklift, to lift the pallet off the ground for transportation. The base cap 10 is typically rectangular or square in shape, to conform to the size and shape of a typical pallet, and includes four side flaps or walls 12 which extend upwardly from the four side edges of the rectangular-shaped base cap 10. The goods 40 are placed on top of the base cap 10 and at least a bottom portion of the goods 40 are surrounded by and retained within the four side walls 12 of the base cap 10. The sealed pallet assembly further includes a bag-like covering 90 which is placed over and around the goods 40 so as to form a sealed enclosure around the goods 40 in conjunction with the base cap 10. The covering 90 may be attached at its bottom edges to the base cap 10 by means of glue, tape or any technique that is known in the art to create, as near as possible, an airtight seal between the covering 90 and the base cap 10. Therefore, the goods 40 are enclosed in a sealed environment created by the covering 90 and the base cap 10.

FIG. 3 further illustrates a gas intake/outtake valve 16, coupled to a side wall 12 of the base cap 10, for allowing an appropriate coupling device attached to the end of a hose, for example, to mate with the valve 16. In this way, the valve 16 can receive a desired gas directed through the hose into the sealed enclosure or chamber. Additionally, the valve 16 may expel unwanted gas out of the sealed enclosure or allow samples of gas to travel to a sensor 140 (FIG. 11) for testing and monitoring purposes. The sensor 140 is described in further detail below with respect to FIG. 11.

Alternatively, or additionally, the sealed enclosure of the present invention may include a gas intake/outtake valve 18 coupled to the bag-like covering 90. In one embodiment, the valve 18 may be integrated into the covering 90 by any means known in the art. Similar to valve 16 described above, the valve 18 allows an appropriate coupling device to mate with valve 18 thereby allowing a desired gas, or combination of gases, to flow into and out of the sealed enclosure formed by the covering 90 and the base cap 10.

Each of the valves 16 and 18 may be any one of a number of well-known valves which can be opened and closed, either manually or automatically, to either start or stop the flow of gases or liquids into or out of the sealed enclosure. For example, the valves 16 and 18 may be threaded metal or plastic pipe ends which can be "Closed" with a threaded cap and "opened" by mating with a threaded end of a hose. As another example, the valves 16 and 18 may be of the type that connect to the end of a hose used to provide carbonation from a carbonation tank to a soda dispensing machine found in most restaurants. In one embodiment, valves 16 and 18 are model no. PLC-12 "quick connector" valves, manufactured by Colder Products Company.

The base cap 10 functions as a barrier between the bottom surface of the goods 40 and the pallet 30 and functions to protect the goods 40 from contaminants and/or moisture present on the pallet or the ground. The base cap 10 can be made from any material such as coated paper, plastic, metal, wood, or coated fabric but is preferably relatively gas and liquid impermeable in order to prevent gases and/or moisture from entering or leaving the sealed enclosure from the bottom.

The base cap 10 is preferably sized and shaped to conform to the size and shape of the pallet 30. In one embodiment, the base cap 10 is rectangular-shaped to substantially conform to the rectangular shape of the pallet 30 on which it rests. The base cap 10 further includes four side flaps or walls 12 which each extend upwardly from a respective edge of the base cap 10 to cover and retain within their boundaries at least a bottom portion of the goods 40. The base cap 10 can be optionally shaped as needed for protection and transportation of any shape and/or size of goods 40 or pallet 30.

The covering 90 may be made from any desired material depending on the function desired to be performed. In one embodiment, the covering 90 may be Semi-permeable to prevent contaminants from entering the enclosure but to allow some gases to escape from the sealed enclosure to prevent the build up of undesirable gases. In another embodiment, the covering 90 may be gas impermeable so as to prevent desired gases from escaping from the internal enclosure.

In another embodiment, covering 90 is sealed to the base cap 10 with adhesive stretch wrap or a heat-shrink wrap which is well-known in the industry. The stretch wrap or heat-shrink wrap encircles the goods 40 and the base cap 10. After heat is applied, the heat-shrink wrap reduces in size to tightly seal and secure the goods 40 and form a seal with the base cap 10.

Optionally, the covering 90 may also have insulating qualities. For example, "bubble wrapping" is a well-known technology that is an effective insulating material. The insulating covering may have other forms such as fiberglass mesh or other high tech fiber, various foam materials, plastic gels, cardboard liners, encasing bags, etc. The particular composition and form of the insulating covering is not limited in the present invention. The insulating covering may be used alone to cover the palletized good or may be layered with other coverings. The insulating covering can be applied like any other covering and helps preserve the goods 40 by preventing contact with external contaminates and/or changes in the atmosphere within the sealed enclosure.

Furthermore, the covering 90 may form an anti-pest barrier. The covering 90 may be treated with a chemical treatment such as an insecticide or an insect repellant. Alternatively, the covering 90 may have a screen-like quality to prevent pests from entering the sealed enclosure. The anti-insect covering may be used by itself or in combination with other coverings and/or wrappings.

Referring to FIG. 4, one embodiment of the invention includes a base cap 10 positioned on top of a pallet 30 and goods 40 placed on top of the base cap 10. As discussed with reference to FIG. 3, in one embodiment, the base cap 10 is rectangular shaped to conform to the typical shape of a pallet and includes four side walls 12 which extend upwardly from the edges of the rectangular-shaped base cap 10 to surround and retain within their boundaries at least a bottom portion of the goods 40 after they have been placed on top of, and into, the base cap 10.

A top cap 20 is then placed over the upper surface of the goods 40 to create a top seal. To complete the enclosure, a side wrapping 80 is applied around the side surfaces of the goods. The side wrapping 80 overlaps the base cap 10 and the top cap 20 to create airtight seals at both intersections. Two methods of applying the side wrapping 80 around the top and base caps, 20 and 10, respectively, and the goods 40, are described in further detail below with reference to FIGS. 9 and 10.

The top cap 20 functions as a barrier placed over the top surface of the goods 40. The top cap 20 can be made from any material such as coated paper, plastic, metal, wood, or coated fabric but is preferably relatively gas and liquid impermeable in order to prevent gases and/or moisture from entering or leaving the sealed enclosure from the top. The top cap 20 is preferably shaped to cover the top surface of the upper-most goods 40. As shown in FIG. 4, in one embodiment, the top cap 20 is rectangular-shaped and includes four side flaps or walls 22 that extend downwardly from each of the four edges of the top cap 20 to cover at least a top portion of goods 40. The top cap 20 can be optionally shaped as needed for protection and transportation of any shape and/or size of goods. The combination of a top cap 20 on a loaded pallet 50 is referred to herein as a pallet assembly.

FIG. 4 further illustrates the wrapping 80 after it has been applied around caps 10 and 20 and over goods 40. The wrapping 80 overlaps the goods 40, the base cap 10, and the top cap 20 to create a sealed enclosure. The wrapping 80 may be made from any desired material depending on the function desired to be performed. In one embodiment, the wrapping 80 may be semi-permeable to prevent contaminants from entering the enclosure but to allow some gases to escape from the sealed enclosure to prevent the build up of undesirable gases. In another embodiment, the wrapping 80 may be gas impermeable so as to prevent desired gases from escaping from the internal enclosure. Also, the products contained inside the pallet enclosure may be packaged in permeable or semi-permeable films to allow these products to be treated with (or exposed) to sanitizing or ripening control agents, and/or to allow for these pre-packaged products to achieve a different modified atmosphere than the "master" pallet atmosphere after the pallet enclosure is removed.

In another embodiment, wrapping 80 is sealed with adhesive stretch wrap or a heat-shrink wrap which is well-known in the industry. The stretch wrap or heat-shrink wrap encircles the goods 40, base cap 10 and top cap 20. After heat is applied, the heat-shrink wrap reduces in size to tightly seal and secure the goods 40 between the base cap and the top cap 20.

Optionally, the wrapping 80 may also have insulating qualities. For example, "bubble wrapping" is a well-known technology that is an effective insulating material. The wrapping may have other forms such as fiberglass mesh or other high tech fiber, various foam materials, plastic gels, cardboard liners, encasing bags, etc. The particular composition and form of the insulating wrapping is not limited in the present invention. The insulating wrapping may be used alone to cover the palletized good or may be layered with other wrappings or coverings. The insulating wrapping can be applied like any other wrapping and helps preserve the goods 40 by preventing contact with external contaminants and/or changes in the atmosphere within the sealed enclosure.

Furthermore, the wrapping 80 may form an anti-pest barrier. The wrapping 80 may be treated with a chemical treatment such as an insecticide or an insect repellant. Alternatively, the wrapping 80 may have a screen-like quality to prevent pests from entering the sealed enclosure. The anti-insect wrapping may be used by itself or in combination with other wrappings.

Figure 5:
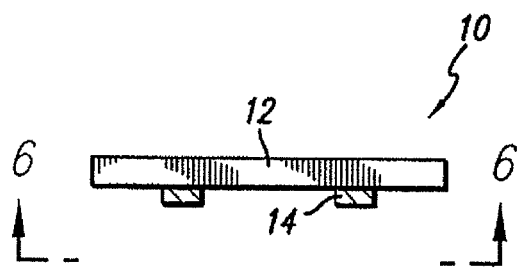
FIG. 5 illustrates a side view of the base cap of FIGS. 3 and 4 having tabs in accordance with one embodiment of the invention.
Figure 6:
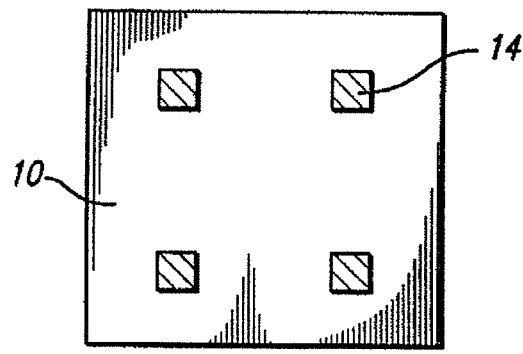
FIG. 6 illustrates a bottom view of the base cap with tabs of FIG. 5, taken from a perspective indicated by line 6-6 of that figure.
Figure 7:
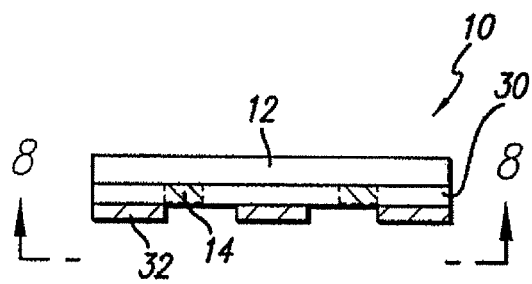
FIG. 7 illustrates a side view of the base cap with tabs of FIG. 5 positioned on a pallet.
Figure 8:
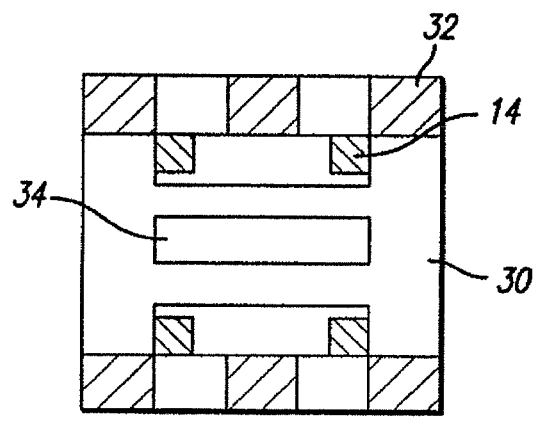
FIG. 8 illustrates a bottom view of the base cap of FIG. 7 positioned on a pallet, taken from a perspective indicated by line 8-8 of that figure.

In the present invention, the base cap 10 optionally includes tabs 14 sized to fit between slats typically found on the pallet 30. FIG. 5 illustrates a perspective side view of the base cap 10 having tabs 14 which help secure the base cap 10 to the pallet 30 by preventing the base cap 10 from moving or sliding around on the pallet 30. FIG. 6 illustrates a bottom view of the base cap 10 of FIG. 5, taken from a perspective along lines 6-6 of FIG. 5. In the embodiment shown, the base cap 10 includes four tabs 14 which extend outwardly from the bottom surface of the base cap 10. FIG. 7 illustrates how tabs 14 fit into the slats of pallet 30 to horizontally lock base cap 10 in position with respect to the pallet 30. The tabs 14 can be any size or material and are preferably integrally constructed to the base cap. As illustrated in FIG. 7, when the base cap 10 is positioned on top of the pallet 30, tabs 14 extend downwardly from the bottom surface of the base cap 10 and protrude into slats 34 (FIG. 8) of the pallet 30 so as to secure the base cap 10 to the pallet 30. FIG. 5 shows a bottom perspective view of FIG. 7 taken along lines 8-8 of that figure. The pallet includes legs 32, also known as lifters 32, and three slats 34. In the embodiment illustrated in FIG. 8, the tabs 14 of the base cap 10 fit into the external corner regions of the two exterior slats to lock the base cap 10 into place with the pallet 30. In other embodiments, the number and size of tabs 14 and slats 34 may be varied depending on desired configurations.

Referring again to FIG. 4, although applying the wrapping 80 can be accomplished by a series of manually executed steps, automated machinery improves the speed and accuracy of the system application and provides significant economics of scale. The machine can either circle the wrapping 80 around the pallet assembly or, alternatively, the machine can rotate the pallet assembly near a dispenser of wrapping 80.

Figure 9:
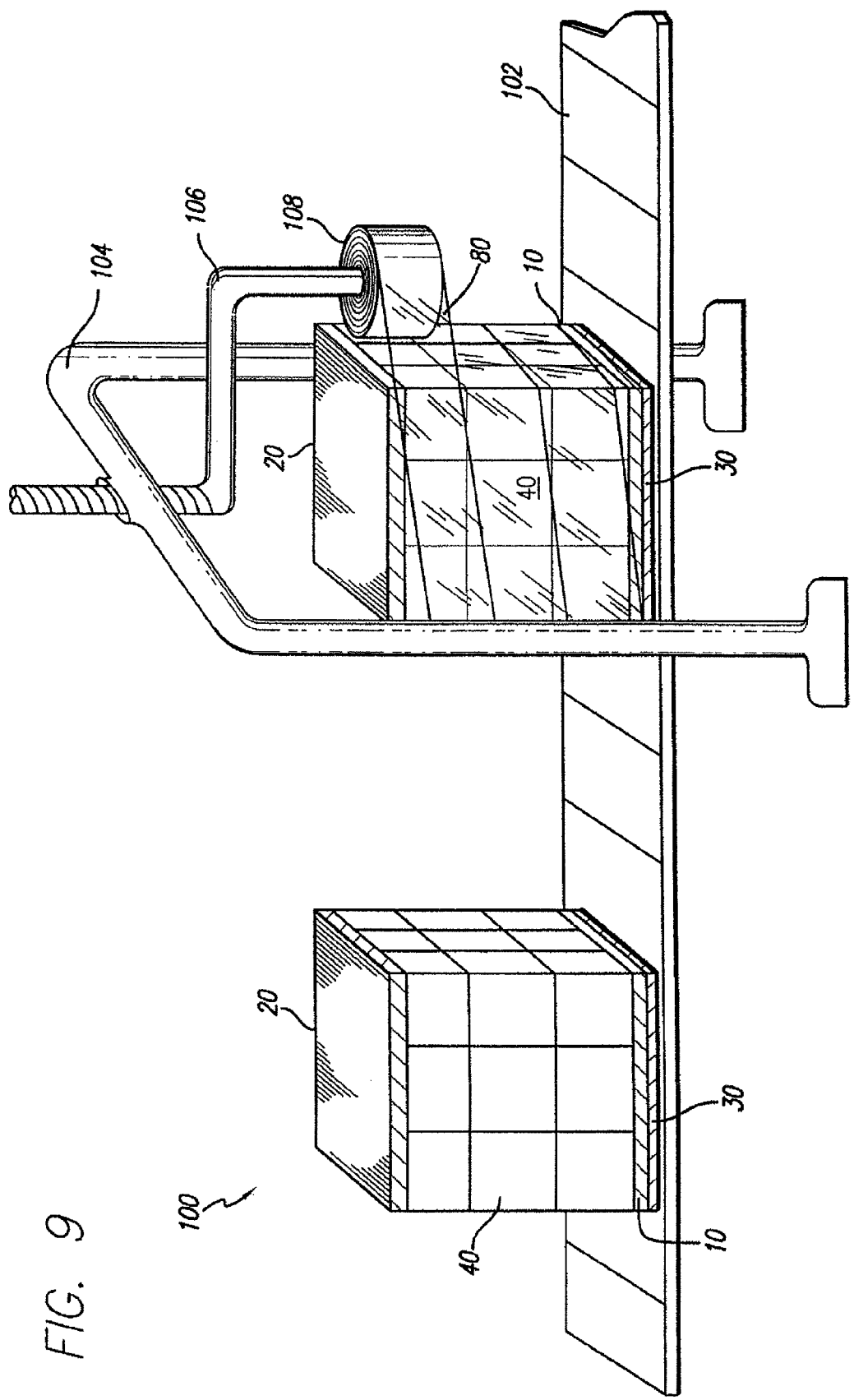
FIG. 9 illustrates a system for applying side wrapping around goods positioned between a base cap and a top cap, in accordance with one embodiment of the invention.

FIG. 9 illustrates an automated wrapping system 100 that revolves a roll 108 of wrapping 80 around the palletized goods 40, base cap 10 and top cap 20. The revolution of a revolving robotic arm 106 dispenses the wrapping 80 around the pallet assembly. Where the width of the wrapping 80 is not as tall as the pallet assembly, the wrapping needs to spiral so that the whole vertical surface of the side walls of the pallet assembly is sealed. To accomplish this spiraling, a support structure 104 and the revolving arm 106 preferably combine to create a device that vertically transposes the roll 108 of wrapping 80, coupled to the robotic arm 106, during application of wrapping 80. For example, revolving arm 106 may be threaded, causing the arm to move up or down during spinning. Alternatively, support 104 may have a hydraulic mechanism that raises or lowers the revolving arm 106 while it spins. Such hydraulic mechanisms are well-known in the art. The wrapping machine 100 may spiral the wrapping 80 automatically or the spiraling may be achieved manually by a person operating the machine. Such automatic or manual machines are also well-known in the art.

The wrapping system 100 further includes an optional conveyer belt 102 that transports the palletized goods to and from the wrapping location. Otherwise, the pallet assembly may be moved to and from the wrapping location by another method such as by forklift, for example. The support 104 holds the revolving arm 106 that holds the roll of wrapping 80. The revolving arm 106, in one embodiment, is coupled to a motor that turns the revolving arm 106 around the palletized goods. In another embodiment, the arm 106 can be turned manually.

Figure 10:
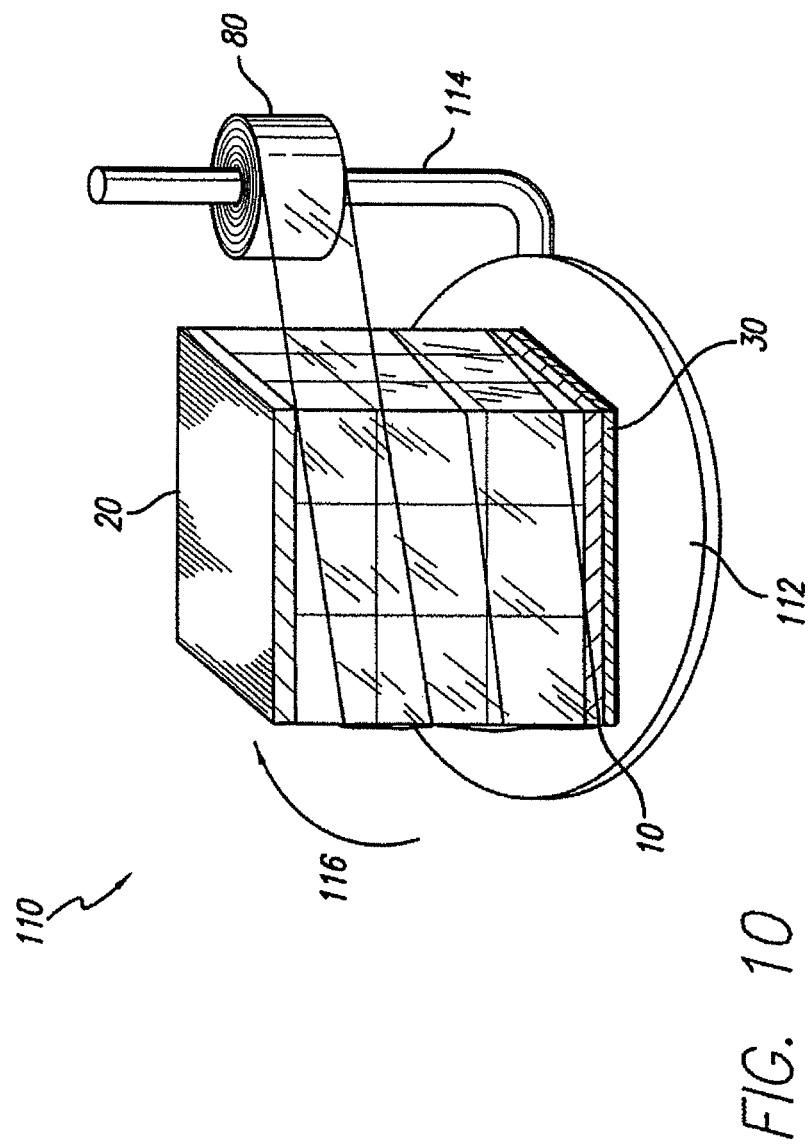
FIG. 10 illustrates another system for applying wrapping to the palletized goods, in accordance with another embodiment of the invention.

FIG. 10 shows a wrapping machine 110 that rotates the pallet assembly near a wrapping dispenser 114 in accordance with another embodiment of the invention. The wrapping machine 110 has a rotating platform 112 that spins the pallet assembly, in a direction indicated by arrow 116, for example, near the dispensing arm 114. The pallet assembly can be placed on the rotating platform 112 by a forklift, robotic arm or other mechanical device. Alternatively, the pallet assembly can be formed directly on the platform 112. The platform may be rotated either manually or automatically by a motor.

As previously discussed, if the width of the wrapping is less than the height of the loaded pallet assembly, there is a need to vertically transpose the wrapping 80. Preferably, the platform 112 and the dispensing arm 114 combine to form a mechanism that vertically moves a roll of wrapping 80, coupled to the dispensing arm 114, relative to the palletized goods 40 so as to spiral the wrapping 80 around the surfaces of the sealed enclosure. For example, dispensing arm 114 may be threaded to force the wrapping 80 to rise or fall at a desired rate as wrapping 80 is applied.

Figure 11:
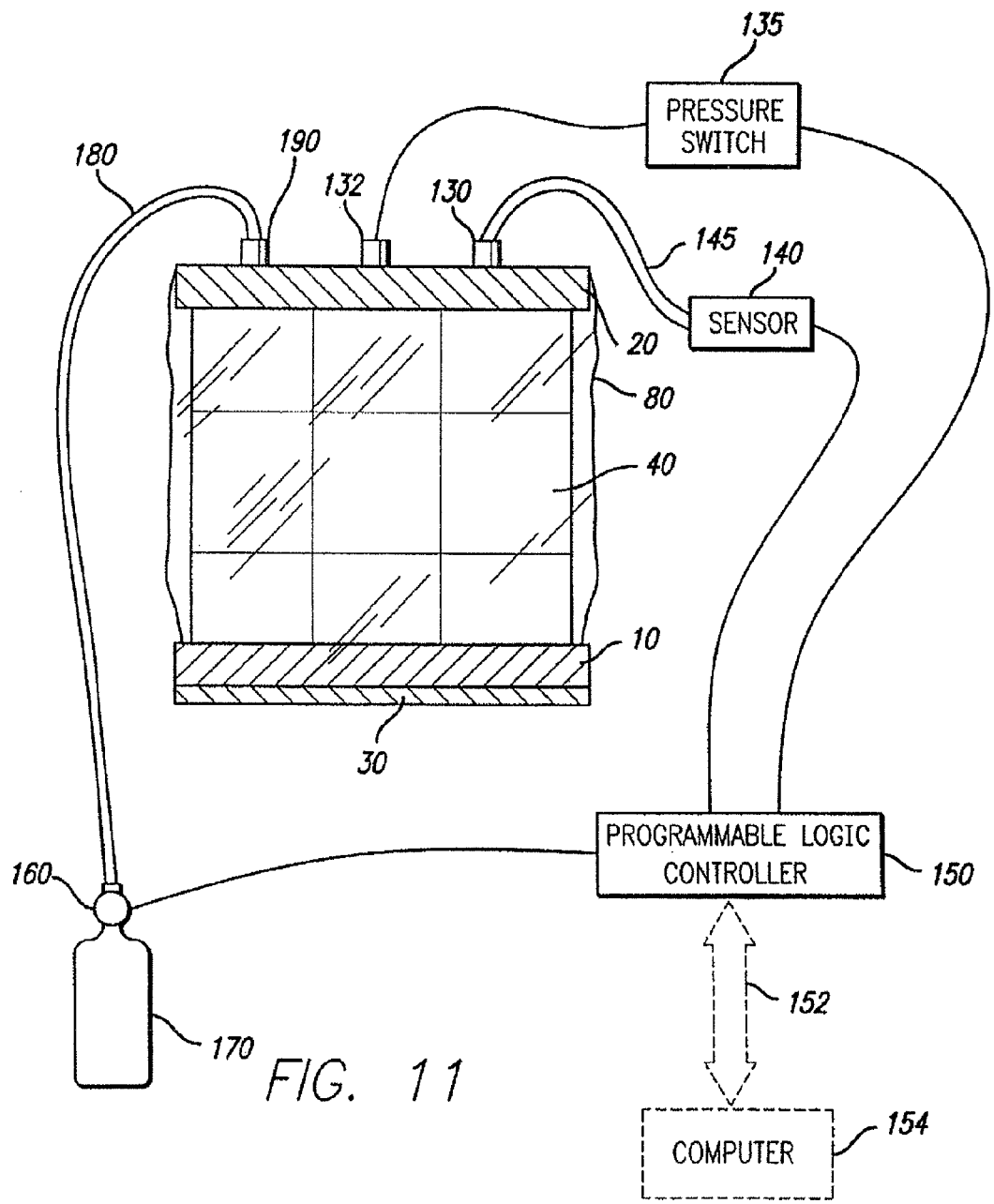
FIG. 11 illustrates a sensor, a pressure switch, a controller and a gas tank coupled to a sealed enclosure, in accordance with one embodiment of the invention. Optionally, a computer is coupled to the controller.

After a sealed enclosure has been formed by one of the methods described above, the present invention further includes a method to establish and, optionally, maintain a modified atmosphere within the sealed enclosure during storage or transportation of the palletized goods. FIG. 11 illustrates one embodiment of a method and system for establishing, and optionally maintaining a controlled environment within the sealed enclosure. The system includes a sensor 140 which can receive samples of gas from the sealed enclosure via a hose 145 coupled to a valve 130 located on the top cap 20. The sensor 140 may be any one of a number of well-known sensors which can sense or measure a desired parameter such as, for example, temperature, concentration levels, humidity, pressure, chemical composition, etc. After the sensor 140 analyzes a gas sample, for example, it processes the information and converts the information into a predetermined data format. This data is then transmitted to a controller 150 for further processing.

In one embodiment, the controller 150 is a programmable logic controller (PLC) which receives data from the sensor 140 and thereafter implements some sort of corrective or responsive action. As shown in FIG. 11, the controller 150 is coupled to an automated valve 160 which is in turn coupled to a gas tank 170. When valve 160 is in an open state, it allows gas from tank 170 to flow through the hose 180 into the sealed enclosure via a second valve 190 coupled to the top cap 20. The controller 150 regulates the flow of a desired gas from the gas tank 170 into the sealed enclosure by either opening or closing the valve 160 in response to data received from the sensor 140. In alternate embodiments, the valve 190 may be of a type capable of being opened and closed automatically and the controller may be coupled directly to valve 190, thereby directly controlling the operation of valve 190 to regulate the flow of one or more gases into the sealed enclosure.

The system of FIG. 11 further includes a third valve 132, coupled to the top cap 20, for evacuating the internal area surrounded by the sealed enclosure. Typically, an evacuation process is carried out prior to injection of a desired gas from an external gas source, e.g., gas tank 170, into the sealed enclosure. A pressure switch 135, coupled to the third valve 132 measures the atmospheric pressure within the sealed enclosure during the evacuation process to ensure that the sealed enclosure has been sufficiently evacuated before the pressurized flow of gas from the external gas source can enter the sealed enclosure via hose 180 and second valve 190. The pressure switch 135 is coupled to the controller 150 and sends a signal to the controller 150 once a sufficient vacuum is created by the evacuation process. Thereafter, the controller 150 can operate the automated valve 160 and/or valve 190 to begin the pressurized flow of gas, otherwise referred to herein as "injection," into the sealed enclosure.

FIG. 11 further illustrates an optional computer 154 which is linked to the controller 150 via a communications link 152. The computer 154 may be a standard personal computer which is well-known in the art and can be used to program the controller 150 with target parameters, set-points and/or operating instructions so that the controller implements a desired protocol for providing monitoring functions and maintaining a desired atmosphere within the sealed enclosure. The computer 152 may be just one of many computers, or servers, connected together in a local area network (LAN), or a wide area network (WAN), or the internet, for example. The internet, and the LAN and WAN networks are well-known technologies and need not be further described herein. By providing connectivity through a computer network, such as the internet, for example, users located at remote computer terminals have the capability of accessing data stored in the controller 150 and/or computer 154, sending commands or instructions to the controller 150, and monitoring the atmosphere within the sealed enclosure.

The communications link 152 can be any type of standard link such as, for example, an ISDN communications line. Alternatively, the communications link 152 may be a wireless link such as an analog or digital communications link. Such analog and digital wireless communication techniques are well-known in the art. By providing a wireless link 152, a user located at the computer 154 can monitor and send instructions to the controller 150 while the rest of the structures illustrated in FIG. 11 are being transported to a location away from the computer 154.

The particular desired atmospheric mixture of gases to be monitored by the controller 150, as described above, depends on the needs of the goods. Preferably, a person can program this desired mixture into the controller 150. Achieving the correct atmosphere is important because it can substantially increase the longevity of many goods. The proper initial modified atmosphere charge, along with the proper film (barrier or semi-permeable), can provide a high degree of atmospheric regulation or maintenance capability, as well as atmospheric consistency within the enclosed pallet of product(s). The gaseous mix may also include ozone or other sanitizing treatments either individually, in sequence, or in various combinations to kill pathogens without harming the product. The particular gas mixtures are well known and need not be further discussed herein.

Each of the valves 130 and 190 is preferably a part that is integrally connected to the top cap 20 to permit access to the sealed enclosure. In one embodiment, each of the valves 130 and 190 is a "quick connector" made of plastic, rubber or another similar material which allows hoses to be snapped on and off the sealed enclosure. Quick connectors are a well-known technology. For example, model PLC-12 quick connectors manufactured by Colder Products Company may be used. The valves 130 and 190 may be integral parts of the base cap 10 or the top cap 20. Alternatively, the valves 130 and 190 may be attached to any part of the bag-like covering 90 (FIG. 3) or wrapping 80 (FIG. 4). In such a system, a hole is cut into the bag 90 or wrapping 80. Then the valves 130 and 190 are attached to the hole with glue, tape, heating or any other method known in the art.

The automated valve 160 and the third valve 132 may be any one of a number of well-known valves which may be automatically controlled and operated by a controller such as a programmable logic controller. Additionally, any one or all of the valves 130, 132 and 190 may, alternatively, be coupled to the base cap 10 rather than the top cap 20.

Figure 12:
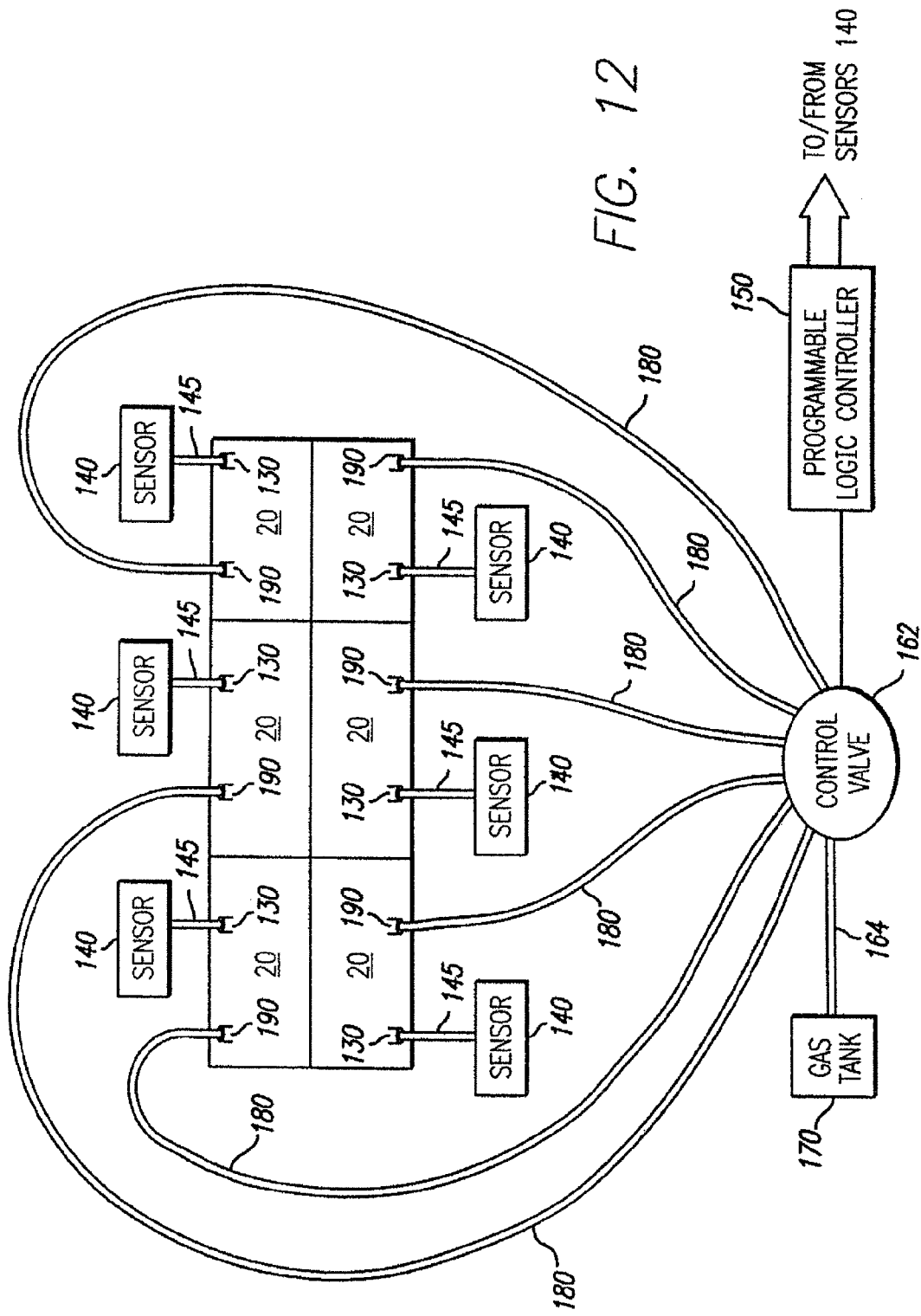
FIG. 12 illustrates multiple sealed enclosures (or other commercial transport or storage units) being monitored and/or controlled by multiple sensors, at least one gas tank and at least one controller, in accordance with one embodiment of the invention.

FIG. 12 illustrates a top perspective view of multiple sealed enclosures in an array being monitored by a single controller 150. For each sealed enclosure, a sensor 140 is coupled, via hose 145, to a valve 130 which is in turn coupled to the top cap 20 of each sealed enclosure. In the embodiment shown in FIG. 12, each sensor 140 is electronically coupled to the controller 150 and periodically transmits data to the controller 150 in accordance with a protocol programmed into the controller 150. Based on the data received from each of the sensors 140, the controller 150 controls the operation of the tank valve 162. In one embodiment, valve 162 is an automatic valve with one input port and multiple output ports which may be automatically controlled by command signals received from the controller 150. The controller 150 can initiate the flow of a particular gas, or atmosphere, from the gas tank 170 into select sealed enclosures by opening select output ports of the valve 162, thereby allowing the desired atmosphere to flow from the gas tank 170 through a respective hose 180 and into the select sealed enclosure via respective valves 190. It is understood that the particular system configuration shown in FIG. 12 is only one of many possible configurations in accordance with the invention. For example, multiple types of sensors 140 may be utilized to monitor multiple parameters, multiple gas tanks may be employed, and valve 162 may be replaced with multiple individual valves each coupled to a respective sealed enclosure.

Figure 13:
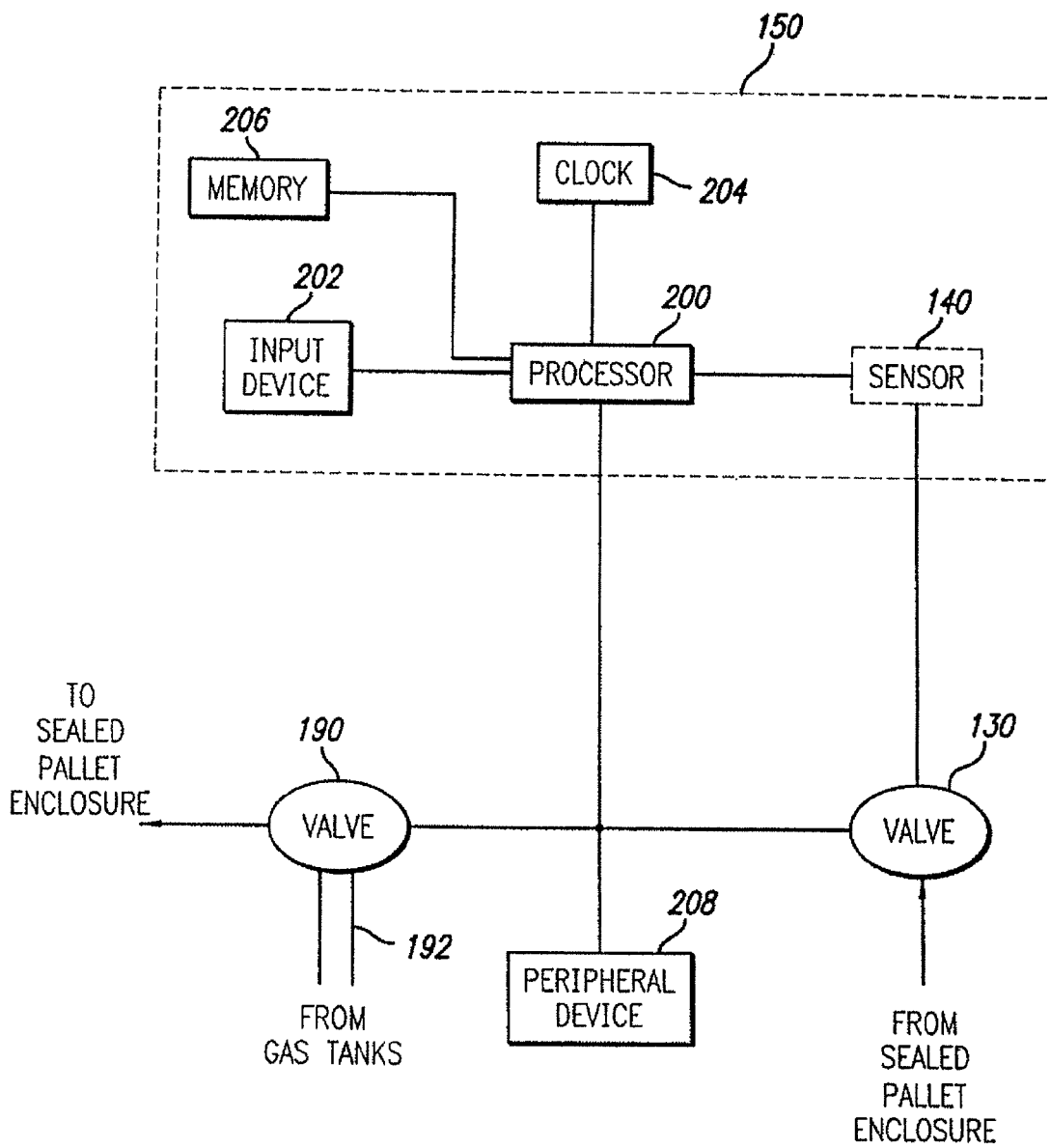
FIG. 13 illustrates a block diagram of some of the components of a controller in accordance with one embodiment of the invention.

FIG. 13 illustrates a block diagram of one embodiment of the controller 150. The controller 150 includes a processor 200 which is programmed by input device 202 coupled to the processor 200. The input device 202 may be an integral part of the controller 150, as shown in FIG. 13, or alternatively, may be an external peripheral device electronically coupled to the processor 200. In one embodiment, the input device 202 may be a computer and keyboard which can receive high-level instructions from a user, compile such instructions into a desired data format, and thereafter program the processor 200. However, any well-known method and device may be used to program the processor 200. The processor 200 receives information from sensor 140 and clock 204 and sends out instructions to valves 130 and 190 (FIG. 11), for example. Note that in contrast to the embodiment shown in FIG. 11, in the embodiment shown in FIG. 13, the sensor 140 is integrated into the controller 150, rather than being a separate device and the controller 150 is directly coupled to the valves 130 and 190 which are coupled to the top cap 20 (FIG. 11). Valve 190 connects to hose 192 from one or more gas tanks allows gas to flow into the sealed enclosure. Valve 130 allows gas to flow from the sealed enclosure to the sensor 140. Clock 204 and input device 202 are optional components of the controller 150.

The logic processor 200 can be any device designed to receive and process information. In one embodiment, the processor 200 is a standard laptop computer which can be programmed, updated, mid/or reprogrammed at will, even via the internet. The processor 200 makes choices based upon instructions built into the processor or programmed by a human operator. The processor 200 receives instructions from the input device 202, which may be a standard computer keyboards for example. The processor 200 further receives information from the sensor 140 and clock 204. In another embodiment, the processor 200 may be a type of mass-produced, transistor-based microprocessor such as a processor chip. These types of devices are well-known and are readily and commercially available.

The input device 202 allows the human operator to alter the decisions made by the logic processor 200. In this way the controller can be adjusted to meet the needs of different goods. As discussed above, the input device 202 may be any one of various well-known input devices such as a computer keyboard, a phone line, or a disk drive capable of programming the processor 200.

The clock 204 can be any time keeping unit which is well-known in the art. Commonly, the clock 204 is a digital timer on the logic processor 200 that emits an intermittent time signal. Alternatively, the clock 204 may be any timekeeping signal from an outside source. The clock 204 permits the processor 200 to make decisions based on time.

The sensor 140 receives gas or atmosphere samples from the sealed enclosure and detects certain qualities. Such sensors are well-known in the art and are readily commercially available. The type of sensor 140 may vary depending on the qualities to be measured. For example, the sensor 140 can contain a thermometer to determine air temperature. The sensor 140 may also contain a barometer to test for air pressure. Preferably, the sensor 140 contains various chemical detectors to determine the composition of the gases introduced into the sealed enclosure. Such sensors are well known and, therefore, will not be further described here. In the embodiment illustrated in FIG. 13, the sensor 140 in the controller 150 converts the results to digital signals that are sent to the logic processor 200. A memory 206, coupled to the processor 200, stores the data received from the sensor 140 for subsequent processing and/or analysis.

The processor 200 responds to information inputs from the clock 204 and the sensor 140 by sending digital commands to open and close the valves 130 and 190. In one embodiment, the valves 130 and 190 may control gas flow in and out of the sealed enclosure respectively. Digitally and electronically controlled valves are well known. In one embodiment, the processor 200 is also coupled to a peripheral device 208 which may be any one of a number of devices and/or circuits known in the art. In one embodiment, the peripheral device 208 may be the computer 154 (FIG. 11) connected to the processor 200 via link 152 (FIG. 11). In another embodiment, the peripheral device may be a circuit for generating an audio and/or visual alarm if data received from the sensor 140 indicates that an atmospheric parameter is not within a predetermined range of a target parameter programmed into the processor 200. Such circuits for generating an audio and/or visual alarm are well-known in the art. Alternatively, the audio and/or visual alarm can be generated by the computer 154 (FIG. 11) by sending an alarm signal from the processor 200 to the computer 154 via the communications line 152 (FIG. 11).

Figure 14:
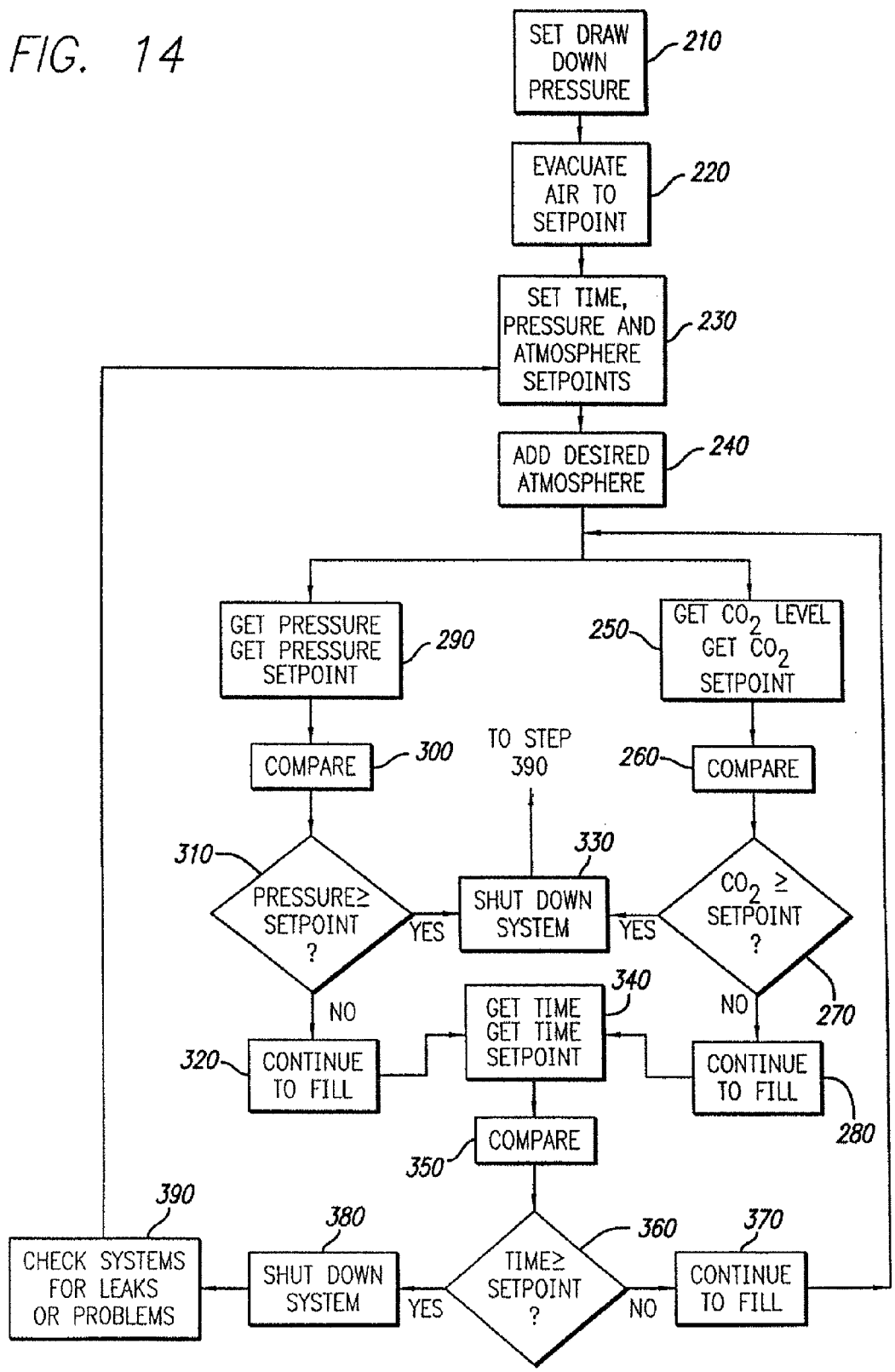
FIG. 14 is a flowchart illustrating some steps of a modified atmosphere process in accordance with one embodiment of the invention.

In one embodiment, the controller 150 is a modified atmosphere ("MA") controller that samples and introduces gases into the sealed enclosure until the desired atmosphere is achieved. After the desired atmosphere is achieved, the MA controller is removed and the sealed enclosure is resealed and transported or stored. A flowchart illustrating the operation of one type of an MA controller, in accordance with one embodiment of the invention, is shown in FIG. 14. This MA controller fills the sealed enclosure with CO2 until desired levels of air pressure and CO2 are achieved or the injection process runs out of time.

In steps 210 and 230, a person enters conditions into the MA controller. As previously discussed, these settings can be programmed into the processor by anyone of numerous input devices and/or methods. The drawdown pressure setting, step 210, defines the amount of air to be removed from the sealed enclosure.

In step 220, air is removed from the sealed enclosure until a sufficiently low pressure or drawdown set point is achieved. After the controller receives the new desired conditions in step 230, the controller opens valves to the gas tanks containing the desired gases. The opening of the valves is the beginning of step 240 in which the desired atmosphere is introduced into the sealed enclosure. A sensor 140 (FIGS. 11 and 13) then begins to monitor the atmospheric conditions within the sealed enclosure by sampling the enclosed atmosphere. In steps 250 and 290, the sensor measures the air pressure and the CO2 levels and the measurements are compared to desired levels in steps 260 and 300. If desired levels are achieved, conditions 270 and 310 are satisfied and shutdown, step 330 is triggered. If either or both conditions are not satisfied, the steps 280 and/or 320 occurs and the controller continues to fill the sealed enclosure.

In step 340 the elapsed time is determined, and in 350 the elapsed time is compared to the desired time limit. If elapsed time has not yet exceeded the programmed time limit, condition 360 fails and the sealed enclosure continues to fill. If the programmed time limit is exceeded, then condition 360 is satisfied and step 380, shutdown, occurs.

After shutdown by either step 330 or 380, in step 390 a check for system leaks or problems is performed. If there are leaks or other problems, in step 390 the human operator fixes the problem and the process returns to step 230 where desired time, pressure, and atmospheric setpoints are reset.

In another embodiment, a controlled atmosphere ("CA") controller establishes the desired atmosphere within the sealed enclosure, and then continues to sample and adjust the atmosphere during transportation. Generally, the CA controller will maintain the desired atmosphere conditions, but the controller can optionally be programmed to adjust the atmosphere during transport or refrigerated storage. For example, the atmosphere can be adjusted, as previously discussed, to allow fruits to ripen as they near market. The controller may also optionally be programmed to fumigate the sealed enclosure during transport. The controller may intermittently add sanitizers or even toxic gases to kill pathogens in the sealed enclosure, but allow the toxic gases to be evacuated or dissipated before reaching the end of transport or controlled storage consumer.

Figure 15:
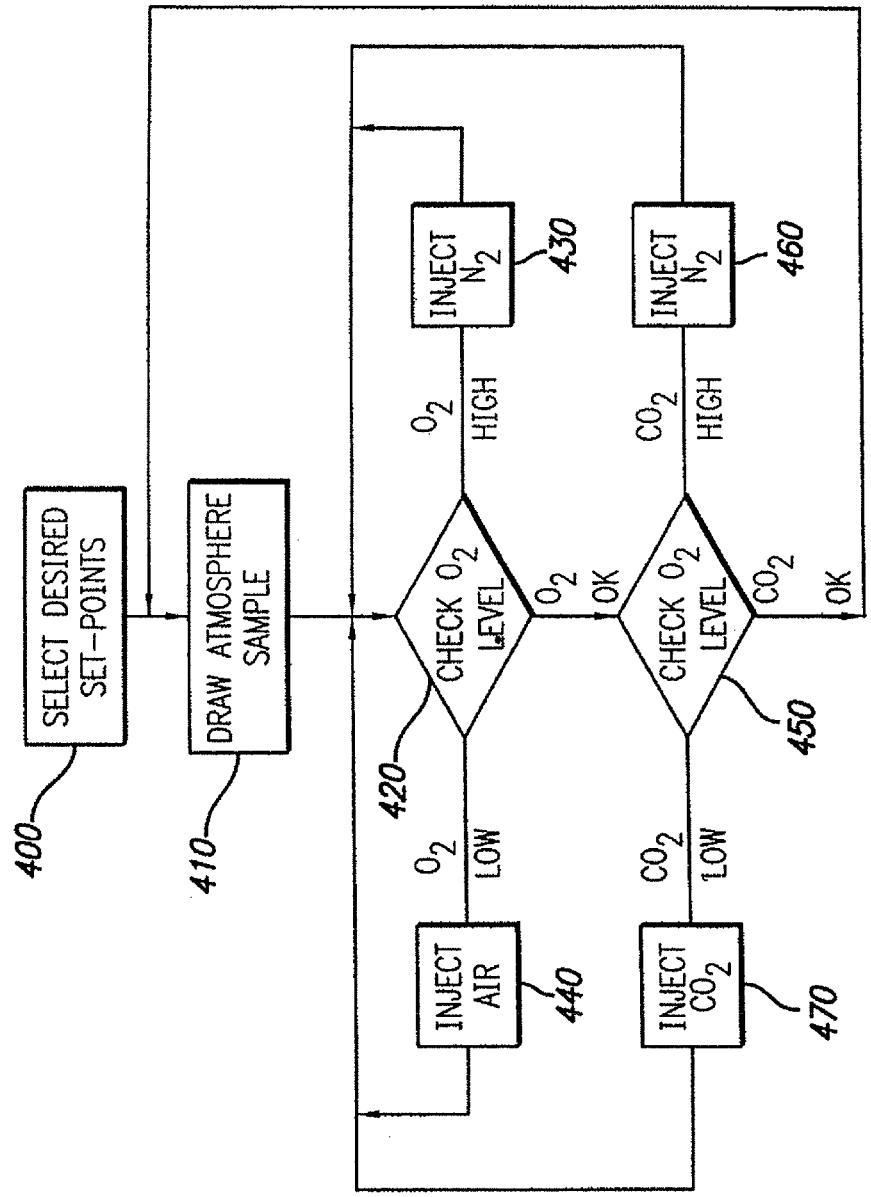
FIG. 15 is a flowchart illustrating some steps of a controlled atmosphere process which first checks for oxygen content, then for carbon dioxide content in accordance with one embodiment of the invention.

The operation or process of a CA controller, in accordance with one embodiment of the invention, is summarized in the flowchart of FIG. 15. The desired conditions or setpoints are selected in step 400. The controller takes an atmosphere sample from the sealed enclosure in step 410. In step 420, the controller compares the levels of O2 to the setpoints selected during step 400. If the O2 levels are low, the controller performs step 440 in which ambient air is added to the sealed enclosure. Conversely, if O2 levels are too high, in step 430 the controller adds N2 to the sealed enclosure. Once the desired levels of O2 are achieved, in step 450, the controller next checks the CO2 levels. If the CO2 levels are low, in step 470 the controller adds CO2 to the sealed enclosure. If CO2 are too high, in step 460 the controller adds N2 to the sealed enclosure. After either step 460 or step 470, the process repeats step 420 in which the controller returns to checking the O2 levels. If the controller measures acceptable levels of both O2 and CO2, the controller returns to step 410 to draw a new air sample to test. The process may continue in time sequence for a predetermined length of time or indefinitely until the controller is removed from the sealed enclosure connection.

Figure 16:
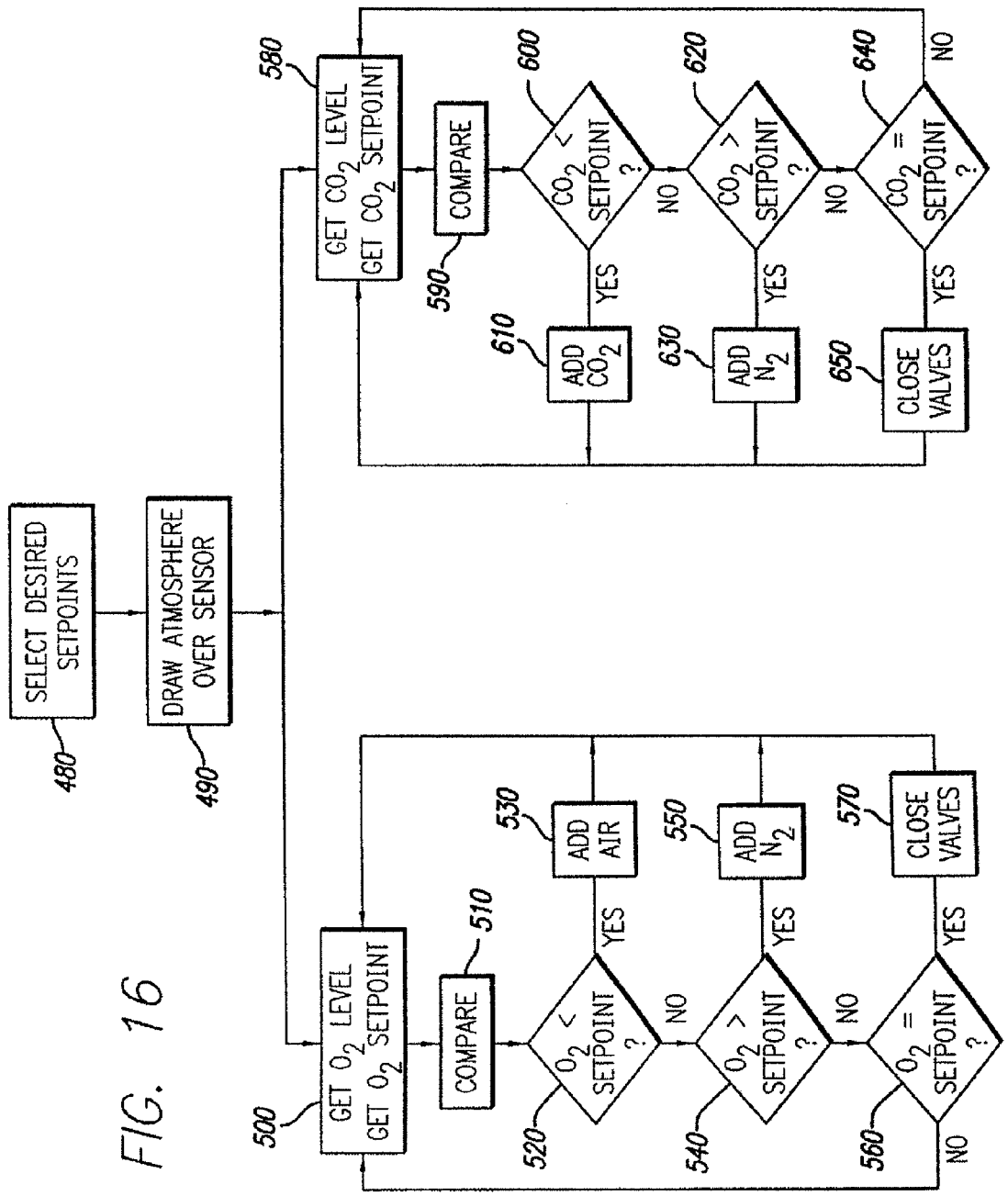
FIG. 16 is a flowchart illustrating some steps of a controlled atmosphere process which simultaneously checks oxygen and carbon dioxide content in accordance with one embodiment of the invention.

The operation or process performed by a CA controller in accordance with another embodiment of the invention is summarized in the flowchart of FIG. 16. The desired conditions or setpoints are selected in step 480. In step 490, the controller takes an atmosphere sample from the sealed enclosure by drawing the enclosed gases over the sensor. In step 500, the controller determines O2 levels and, in step 510, compares the levels of O2 to the setpoints selected during step 480. If O2 levels are low, then condition 20 is true, and step 530 occurs. In step 530, the controller opens a valve to add ambient air to the sealed enclosure. If O2 levels are too high, condition 540 is true, and the controller responds in step 550 by adding N2 to the sealed enclosure. Once the desired level of O2 are achieved condition 560 is true, and the controller performs step 570 by closing air valves coupled to the sealed enclosure, thereby preventing the flow of any gases to/from the interior of the enclosure.

While monitoring and maintaining the O2 levels, the controller simultaneously checks and adjusts CO2 levels. In step 580, the controller determines the levels of CO2 and in step 590 the controller compares the measured levels of CO2 levels to desired setpoints. If CO2 levels are low, condition 600 is true, and in step 610, the controller opens the valve to CO2 tanks for a predetermined amount of time and, thereafter, returns to step 580 to determine the level of CO2—If the CO2 levels are high, condition 620 is true, and in step 630 the controller opens the valves to the N2 tanks (or source) to allow N2 to enter the sealed enclosure. Once desired levels of CO2 are achieved, condition 640 is satisfied, in step 650 the controller closes valves to the CO2 tanks and N2 tanks (or sources).

Figure 17:
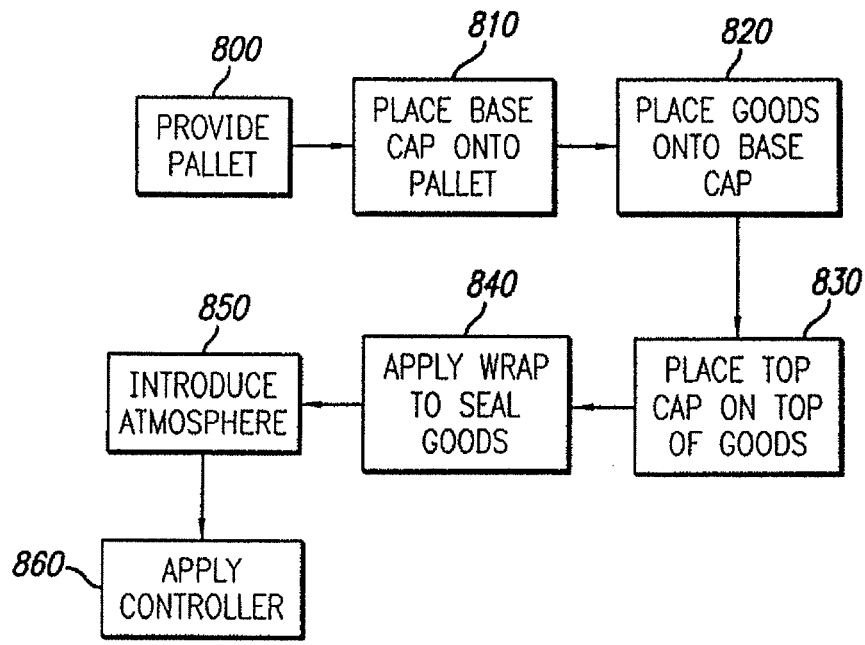
FIG. 17 is a flowchart of a method used to create and maintain a sealed enclosure with a top and base cap and a side wrapping in accordance with one embodiment of the invention.

A method for creating a sealed enclosure around perishable agricultural products or other products stacked on pallets, and for establishing and maintaining a modified atmosphere within the sealed pallet or bin enclosure is provided. An exemplary process includes the following steps, as illustrated and described in FIG. 17.

Step 800: Provide pallet. The pallet can be positioned manually. Alternatively, the pallet can be positioned mechanically by a machine such as a forklift or mechanical arm.

Step 810: Put base cap on the pallet. The base cap can be positioned manually or by a machine such as a forklift or mechanical arm. FIG. 3 illustrates the base cap 10 positioned on the pallet 30. The base cap may be:

a) placed on the pallet (later weighted by the goods and secured by the wrapping of plastic film);

b) glued, taped or secured to the pallet; and/or c) may be constructed with bottom locking tabs 14 (FIGS. 5-8) to fit securely between the boards of the pallet to prevent the base cap from moving during transit. FIG. 4 shows a base cap with side flaps 12 which retain a bottom portion of the goods 40 placed on top of the base cap 10. In one embodiment, flaps 12 can be either folded down to cover part of the pallet or folded up to cover part of the goods. The folded flaps 12 create a vertical surface onto which a cover 90 (FIG. 3) or wrapping 80 (FIG. 4) may be attached and sealed.

Step 820: Position goods onto the base cap. The goods can be positioned on the base cap and pallet manually by workers or by a worker with a pallet squeeze. Alternatively, a forklift or overhead crane or even an industrial robot can mechanically position the goods. Similarly, packaging materials may be placed around the goods. The goods may also be glued, taped, or otherwise secured to the base cap. Again, this securing process can be accomplished manually or mechanically through a device such an industrial robot.

Step 830: Position the top cap over the stacked containers or boxes of goods, as illustrated in FIG. 4. A machine such as a forklift, crane, or industrial arm, as described above can position the top cap manually or mechanically. FIG. 4 shows the top cap with side walls or flaps 22. The flaps 22 may be folded down to cover a portion of the top boxes of goods. A robot arm can accomplish the folding mechanically, for example. After folding, the flaps 22 can be secured to the goods by glue, tape or similar substances. The folded flaps 22 create a vertical surface on which to connect a wrapping 80 (FIG. 4).

Step 840: Apply a wrap covering. The wrapping may be applied by circling one or more tolls of wrapping 80 (FIGS. 9 and 10) around the pallet assembly so as to create an enclosure around the goods in conjunction with the top and bottom caps. FIG. 4 illustrates a preferred application of wrapping

80, which includes overlapping the wrapping over base cap 10 and top cap 20. However, the wrapping 80 can be applied using any one of numerous methods well known in the art. For example the transporter could pour, spray, spin, etc., the cover onto the palletized goods. Preferably, the application creates a smooth seal between the palletized goods and the cover. Alternatively, a worker can manually apply the wrapping by walking around a pallet assembly while dispensing the wrapping. Alternatively, the worker can spin the pallet assembly near a wrapping dispenser. The wrapping machine's previously described with respect to FIGS. 9 and 10 can also apply the wrapping. Optionally after positioning, the wrapping is secured to the caps and goods by various methods such as by heating, taping, zip-sealing and/or gluing the wrapping to the top and base caps.

Step 850: Inject or establish the proper atmosphere in the sealed enclosure and, as required during the injection or metering process, vent sealed enclosure to allow for rapid and efficient replacement of the enclosure atmosphere. The proper atmosphere can be accomplished in the following ways:

a) in one embodiment, the method automatically measures and adjusts the CO2 and O2 levels within the enclosure by use of the controllers previously described.

b) it is also possible to manually measure and adjust the amount of CO2 and N2 required within the enclosure. Based on sample test runs, a simple automated system based on a uniform sized sealed enclosure may be established.

c) the required atmosphere may be calculated based on injection time and pressures, net volume of space within the enclosure, the product's needs, etc. and then injected manually or via an automated system.

d) in another embodiment, the product respiration may create its own modified atmosphere within the sealed enclosure (where time, value and product sensitivity or other factors allow).

e) in another embodiment, a calculated amount of dry ice may be placed within the sealed enclosure to achieve a desired amount of CO2.

The methods described in options a to c require a human to connect hoses and valves to the sealed enclosure to introduce the desired gases. Such hoses would interconnect air tanks or external gas sources (CO2, N2, O3, 1-MCP, etc.) to the controller and to the sealed enclosure. A controller can then be used to control the emissions of gases from the tanks (or sources) into the enclosures by automatically opening and closing valves coupled between the air tanks (or sources) and the enclosure.

The above steps 810-850 may be repeated to create two separate enclosures on the same pallet. A new base cap 10, new goods 40, and a new top cap 20 can be placed over a completed pallet assembly. After the side wrapping 80 is applied, two separate internal enclosures exist on the same pallet.

Step 860: Apply controller. A controller can monitor and regulate the atmosphere within the sealed enclosure by implementing one of the processes illustrated in FIGS. 14-16, for example. Preferably, as previously discussed, the controller has connections which allow workers to snap hoses on and off the respective valves.

Figure 18:
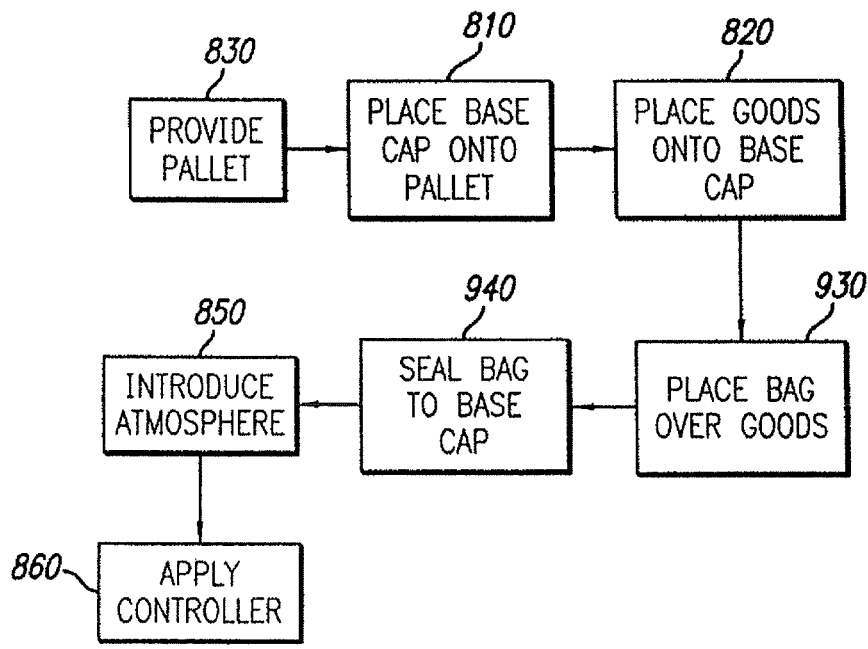
FIG. 18 is a flowchart of a method used to create and maintain a sealed enclosure with a bag cover and a base cap in accordance with one embodiment of the invention.

FIG. 18 illustrates an alternative pallet packing method in which a bag-type covering 90 (FIG. 3) is used instead of a top cap 20 and side wrapping 80. In this new method, Steps 930 and 940 replace Steps 830 and 840:

Step 930: Position Bag over goods. FIG. 3 illustrates a covering 90 positioned over goods 40. The covering 90 is installed by placing the open end over the top of the loaded pallet. The covering 90 may be installed either manually or automatically by a machine that positions the covering over the goods.

Step 940: Seal covering to base cap. The open end of the covering is secured to the base cap by various techniques such as by gluing or taping. The glue or tape can be manually applied or applied by a machine that circles the pallets. Sealing the sealed enclosure may be accomplished using wide adhesive tape, adhesive strips, stretch film, adhesive plastic film(s), or adhesive sealant sprayed or applied between the plastic bag or film wrap and the bottom cap or film, or any other method which is known to create an air-tight enclosure. The introduction of atmosphere (Step 850) and the application of the controller (Step 860) are similar to those steps described above with respect to FIG. 17. Therefore, the description of those steps is not repeated here.

Figure 19:
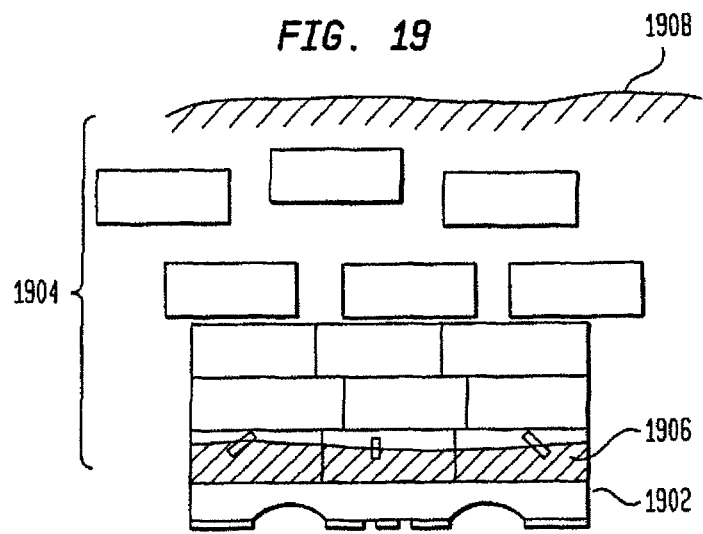
FIG. 19 is a diagram illustrating manual stacking process.

FIG. 19 is a diagram illustrating a manual stacking process in one embodiment. Bottom sheet 1906 is placed on an empty pallet 1902. Products 1904 are stacked, e.g., by hand, on top until full pallet is built. Bottom sheet 1906 is then taped up to side of pallet on all four sides. Similarly, top sheet 1908 is placed on top and taped down on all four sides. The pallet is transported, e.g., with a fork lift, and placed on a portable stretch wrap machine, such as the one shown in FIG. 20.

Figure 20:
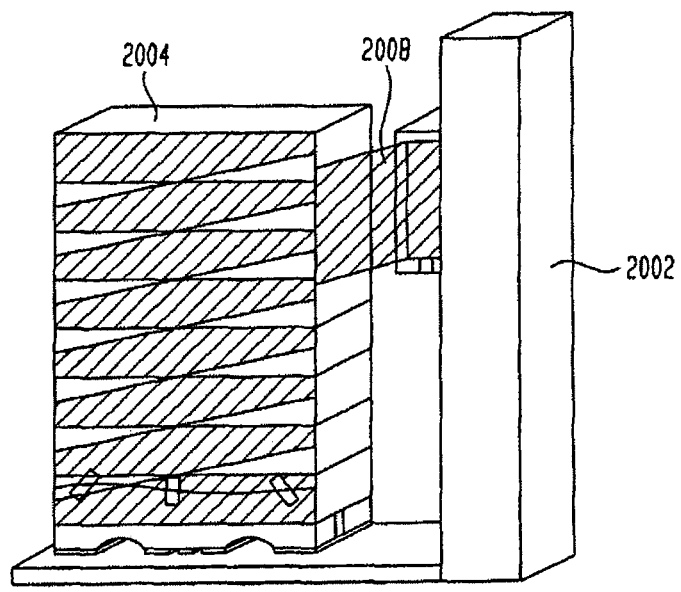
FIG. 20 is a diagram illustrating manual wrapping process.

FIG. 20 illustrates a wrapping process in one embodiment for a full pallet, e.g., built according to the embodiment shown in FIG. 19. Pallet 2004 is wrapped from the bottom of the pallet to the top and back to the bottom creating, for example, two layers of stretch wrap on pallet. A stretch wrap machine 2002, e.g., rolls out the wrap material 2008 to wrap the pallet 2004. The pallet 2004 is then transported to a controller that automatically adjusts the atmosphere inside the pallet as described above.

Figure 21:
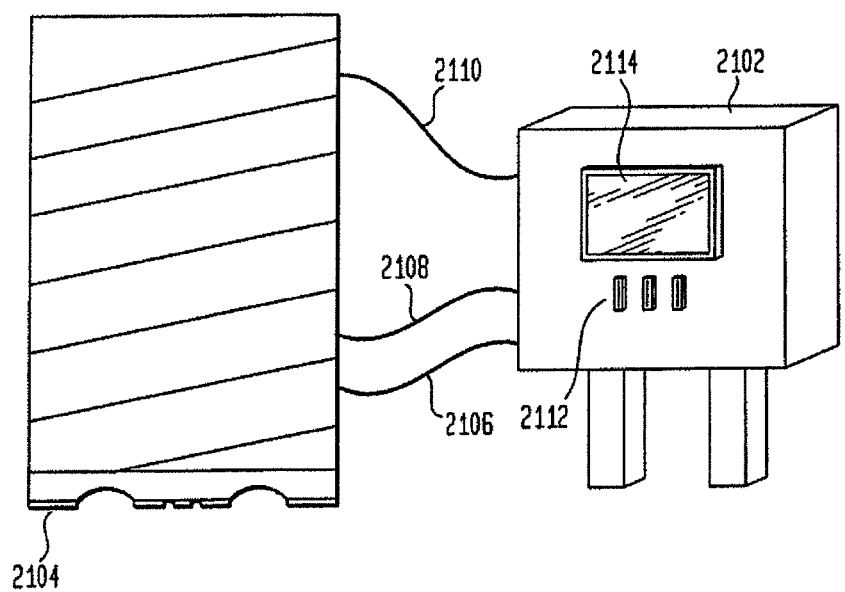
FIG. 21 illustrates the pallet that is attached to a gas controller.

FIG. 21 illustrates the pallet that is attached to a gas controller. A vacuum wand or sample line 2106 is inserted between a layer of boxes near the bottom of the pallet. An injection wand 2110 is inserted between a layer of boxes near the top of the pallet. When the wands 2106, 2108, 2110 are connected between the controller 2102 and the pallet 2104, the controller 2102 may be enabled, for example, by pressing an "enable" button 2112.

The controller then vacuums the pallet 2104, via the wand 2106 until a negative pressure is reached. The pallet 2104 is vacuumed to ensure that there are no leaks on the wrapped pallet 2104. When a negative pressure is reached, assuring that there is no leak, the injection cycle starts by injecting carbon dioxide (CO2) into the pallet 2104. In one embodiment, the vacuum stays on to help "PULL" the CO2 into the pallet 2104. The sample line 2108 connected between the pallet 2104 and the controller 2102 runs simultaneously, drawing sample atmosphere out from the pallet 2104. The controller detects the CO2 levels in the pallet by reading the CO2 level in the sample.

This CO2 injecting and sampling cycle continues until a desired CO2 level is reached inside the pallet 2104. The desired CO2 level, e.g., may be preset in the controller, e.g., using controller's touch screen input functionality. When the controller detects that the desired CO2 level has reached, the controller 2102 stops the cycle and displays the CO2 level in the pallet 2104. The controller 2102 may also inform the operator, e.g., by display 2114 or audio functions, that the cycle has completed successfully. The lines 2106, 2108, 2110 are then removed and the remaining openings in the pallet 2104 where the lines were inserted are closed. The pallet 2104 is then made ready for shipment.

Figure 22:
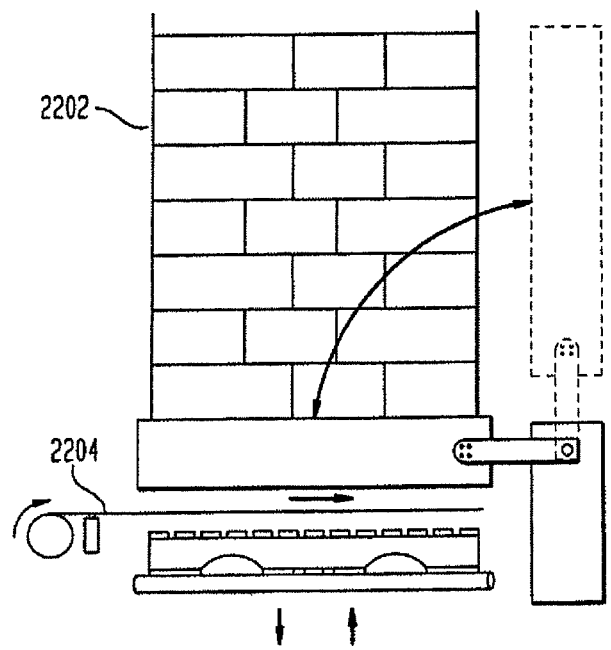
FIG. 22 illustrates a semi-automatic process that packages products on a pallet and inserts desired atmosphere inside the pallet.

FIG. 22 illustrates a semi-automatic process that packages products on a pallet and inserts desired atmosphere inside the pallet. A pallet 2202 of products from the field is placed on an input conveyor 2204. The pallet 2202 moves down conveyor 2204 and enters the top/bottom sheeting section. Squeeze arms 2206 swing down into place and hold products 2202 while the conveyor section 2204 lowers with the pallet to create a space for the bottom sheet 2208 to be pulled into place. The conveyor then lifts back up and the bottom sheet is cut, and the squeeze arms release the pallet and swing back up out of the way for the pallet to advance.

The leading edge of the bottom sheet may have an adhesive on it and there may be a mechanism that will rise up to adhere the edge of the sheet to the pallet to prevent it from getting caught in the equipment while advancing to the next queue. There may be a taping mechanism to tape the leading edge of the bottom sheet to the pallet before it advances to the next queue to prevent it from getting caught in the equipment.

Figure 23A:
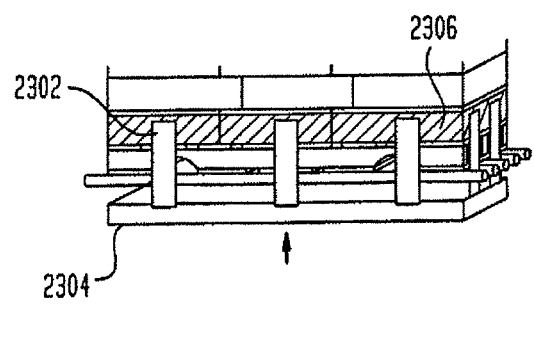
FIGS. 23a and 23b illustrate the lift table with fingers.
Figure 23B:
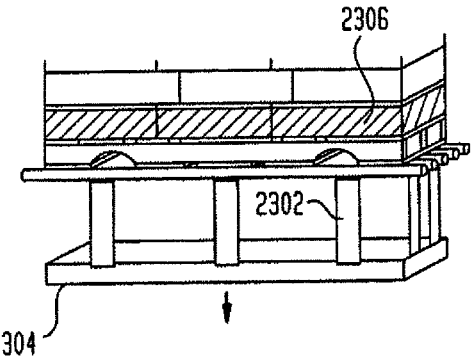

A top sheet is then pulled into place and cut. The pallet then advances to the wrap station. Once the pallet is in the wrap station, a lift table with fingers rises from below the conveyor to hold bottom sheet up in place for the wrap cycle. FIGS. 23a and 23b illustrate the lift table with fingers. As shown in FIG. 23a, fingers 2302 on a lift table 2304 rises up to hold the bottom sheet 2306. A top plate also may lower with fingers to hold the top sheet in place for the wrap cycle.

The wrap cycle begins, for example, by starting at the bottom of the pallet and goes to the top of the pallet and back to the bottom, creating two layers of stretch wrap on the pallet. When the wrap cycle ends, the top plate lifts up sliding the fingers out from between the stretch wrap and the pallet. The bottom lift table lowers also removing the fingers.

Figure 24:
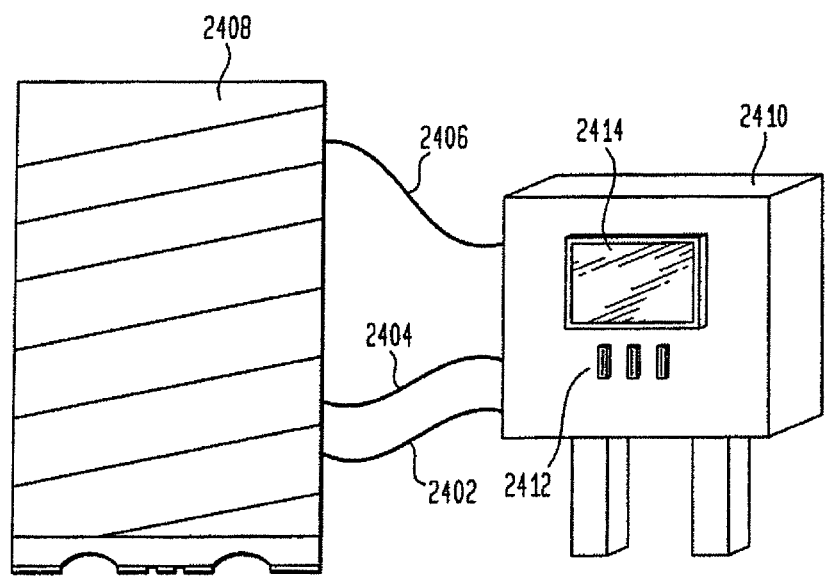
FIG. 24 illustrates an example of gassing station.

The pallet then advances to the gassing station as shown in FIG. 24. FIG. 24 illustrates an example of a gassing station. Once in the station, an operator may insert the vacuum line 2402 and sample/pressure sensor line 2404 in between a layer of boxes near the bottom of the pallet. In an exemplary embodiment, vacuum line 2402 and sample/pressure sensor line 2404 are integrated together so that one line is inserted by the operator for vacuuming and sampling. For instance, sample line 2404 is located inside vacuum line 2402. Alternatively, vacuum line 2402 and sample/pressure sensor line 2404 are separate lines so that both lines are independently inserted by the operator. An operator may also insert the injection line 2406 between a layer of boxes near the top of the pallet. In an exemplary embodiment, for a manual system and a semi-automated system, injection line 2406 will have integrated therein one or more other lines for injecting different gases, for instance, CO2 and/or nitrogen and/or ozone. Alternatively, injection line 2406 does not include any other lines integrated therein.

Once the lines or wands are in place, a controller 2410 may be engaged, for example, by pressing an "enable" button 2412 on the controller. The controller 2410 vacuums pallet until a negative pressure is reached. This is done to make sure that there are no leaks on the wrapped pallet. Once a negative pressure is reached assuring there is no leak, the injection cycle starts, injecting CO2 into the pallet. The vacuum stays on to help pull the CO2 through the pallet to create a mixed atmosphere more quickly. The sample/pressure sensor line 2404 is also running simultaneously to read the CO2 levels in the pallet, in real time. The cycle continues until CO2 level reaches the desired level. This desired level may have been set previously, for example, by using a touch screen 2414 on the controller 2410. The controller 2410 then stops, displays the CO2 level in the pallet 2408, and informs the operator of a successful cycle. The operator then may remove the lines 2402, 2404, 2406 and place tapes over the holes. Operator then advances pallet onto the output conveyor where it is picked up by a forklift and is ready for shipment.

Figure 25:
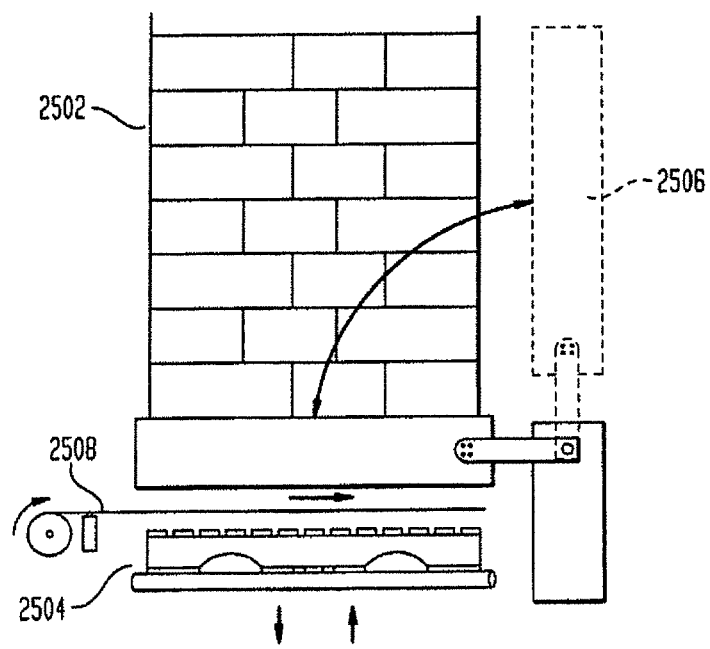
FIG. 25 illustrates automated procedure for wrapping and inserting desired amount of gas into a pallet before the pallet is ready to be shipped.

FIG. 25 illustrates automated procedure for wrapping and inserting desired amount of gas into a pallet before the pallet is ready to be shipped. Pallet 2502 of product from the field is placed on the input conveyor 2504. Pallet moves down conveyor and enters the top/bottom sheeting section. Squeeze arms 2506 swing down into place and hold product while the conveyor section 2504 lowers with the pallet to create a space for the bottom sheet 2508 to be pulled into place. The squeeze arms 2506 are, for example, mechanical or robotic arms. The conveyor 2504 then lifts back up and the bottom sheet 2508 is cut, and the squeeze arms 2506 release the pallet 2502 and swing back up out of the way for the pallet to advance.

The leading edge of the bottom sheet may have an adhesive on it and there may be a mechanism that will rise up to adhere the edge of the sheet to the pallet to prevent it from getting caught in the equipment while advancing to the next queue. There may be a taping mechanism to tape the leading edge of the bottom sheet to the pallet before it advances to the next queue to prevent it from getting caught in the equipment. Similarly, a top sheet is then pulled into place and cut.

Figure 26:
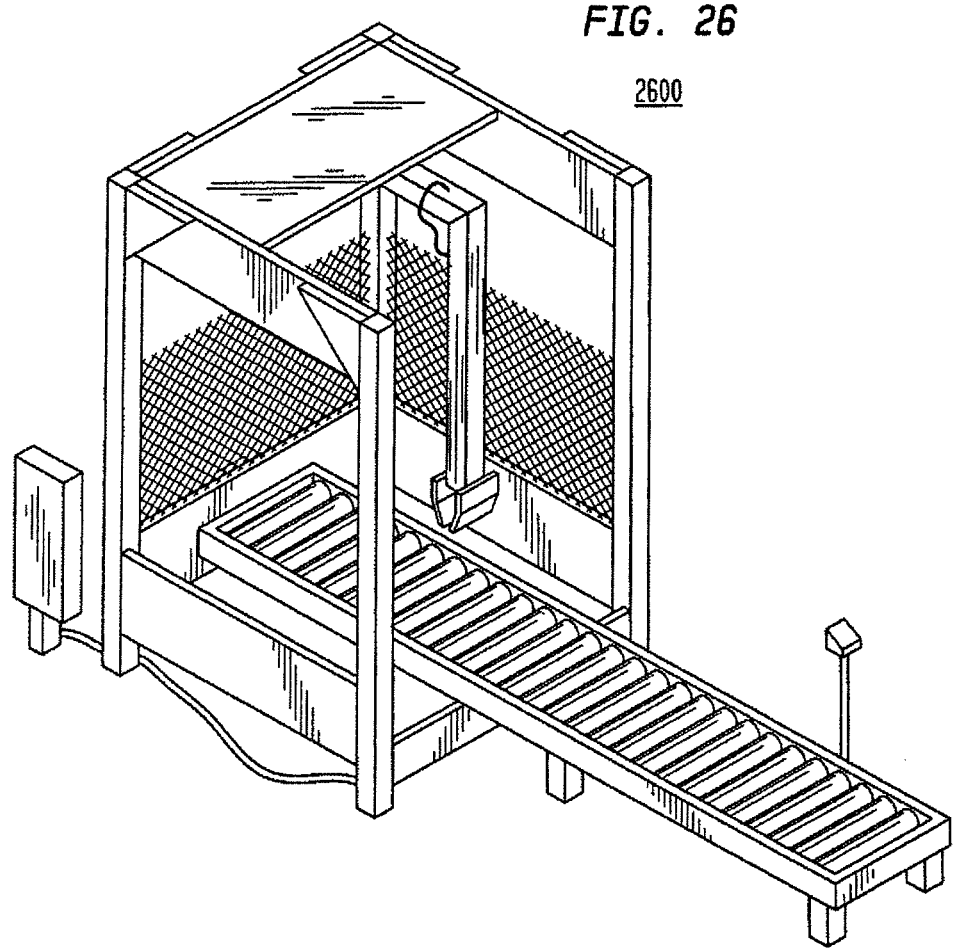
FIG. 26 illustrates a wrap station 800 in one embodiment.
Figure 27A:
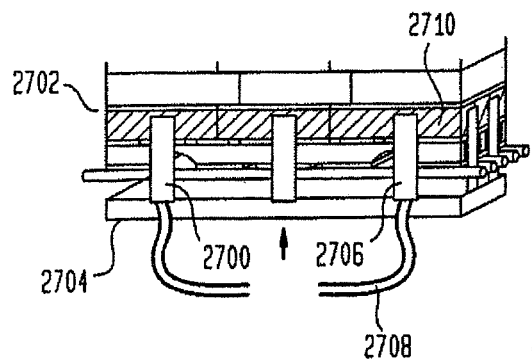
FIGS. 27a and 27b illustrate a lift table with fingers for holding a pallet in position.
Figure 27B:
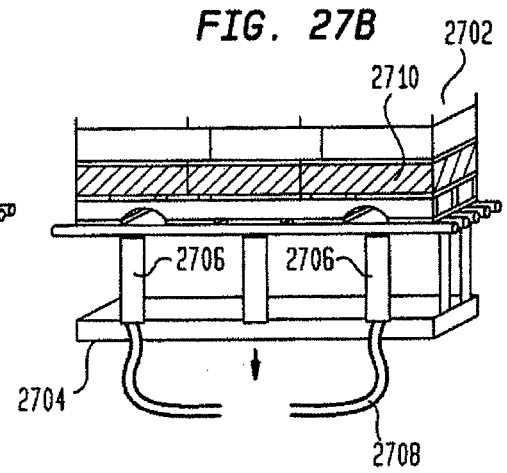

The pallet then advances to the wrap station. FIG. 26 illustrates a wrap station 2600 in one embodiment. FIGS. 27a and 27b illustrate a lift table with fingers for holding a pallet in position. As shown in FIGS. 27a and 27b, once the pallet 2702 is in the wrap station 2600 (FIG. 26), a lift table with fingers 2706 rises from below the conveyor to hold bottom sheet 2710 up in place for the wrap cycle. A top plate also lowers with fingers to hold the top sheet in place for the wrap cycle. The wrap cycle begins, for example, by starting at the bottom of the pallet and goes to the top of the pallet and back to the bottom, creating two layers of stretch wrap on the pallet. Some or all of the fingers 2706 are hollow tubes and may be equipped with lines 2708. In an exemplary embodiment, lines 2708 are one or more lines, such as vacuum, sample, pressure sensor and/or injection lines. The injection lines may or may not be integrated for a fully-automated system. The inject lines may be joined to inject through a single finger or separate to inject through different fingers. One or more gasses can be injected, for example, three gases can be injected through the finger(s). Additionally, the vacuum, sample and/or pressure sensor line(s) may or may not be integrated. The line(s) may be joined to vacuum, sample and/or sense through a single finger or vacuum, sample and/or sense through different fingers. Fingers 2706 remain in the wrap. Once the wrap cycle is complete, a controller starts the gas cycle.

In one embodiment, a controller vacuums the pallet until a negative pressure is reached. This is done to make sure there are no leaks on the wrapped pallet. Once a negative pressure is reached assuring that there is no leak, the injection cycle starts, injecting CO2 into the pallet. The vacuum stays on to help pull the CO2 through the pallet to create a mixed atmosphere more quickly. The sample line is also running simultaneously to read what the CO2 levels are in the pallet in real time. The cycle continues until a desired CO2 or prescribed gas levels are reached. This desired level, for example, may have been set previously, for example, using a touch screen on the controllers. When the gas cycle is complete, the top plate and the lift table pull away to slide the fingers out from between the wrap and the pallet as shown in FIG. 27b. Additional final wraps or sealing may be completed as required. The pallet then advances to the output conveyor to be picked up by a forklift.

Figure 28A:
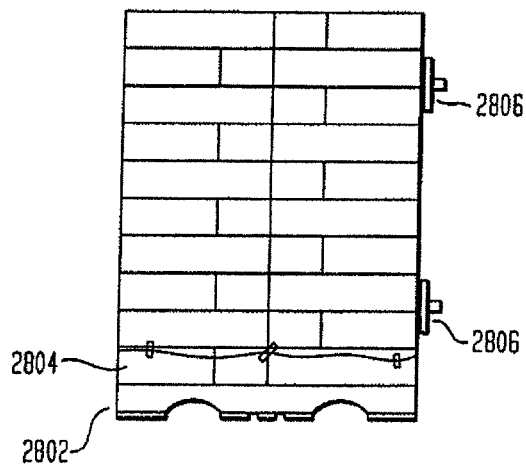
FIGS. 28a and 28b illustrate wrapping process for one or more products stacked on a pallet in one embodiment.
Figure 28B:
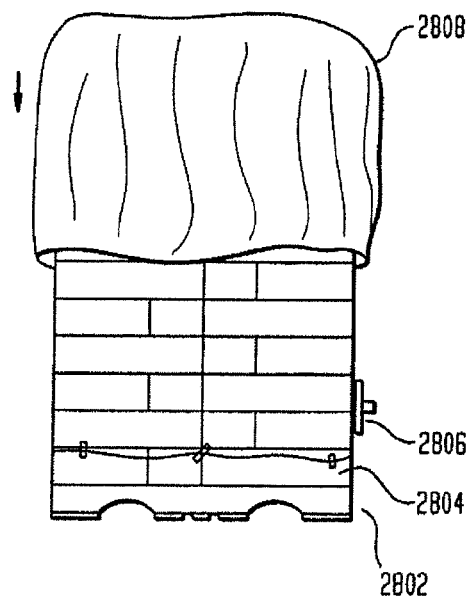

FIGS. 28a and 28b illustrate wrapping process for one or more products stacked on a pallet in one embodiment. A bottom sheet 2804 is placed on the pallet 2802 by using either a fork truck with squeeze attachments to lift the product off the pallet to slide the sheet in place, or the sheet may be placed on the pallet in the field prior to being "built" or stacked with product. Bottom sheet 2804 is then taped up into place. A quick-connect hose fittings 2806 are adhered in place on the pallet 2802. As shown in FIG. 28b, a pallet bag 2808 may be placed over the pallet, taped flush to the pallet 2802, and taped down to the bottom sheet. A cardboard tie sheet may also be placed on top of the pallet.

Figure 29A:
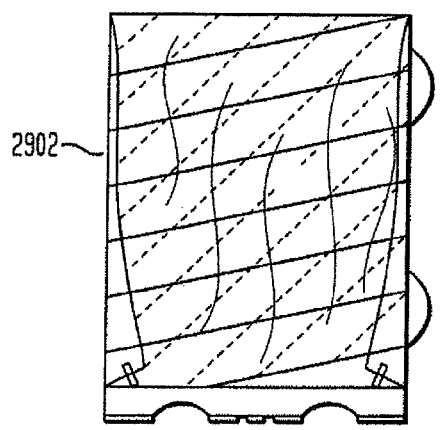
FIG. 29a illustrates a pallet having a wrap and bagging.

In one embodiment, the pallet is placed on the stretch wrap machine and wrapped, for example, from the bottom of the pallet, to the top of the pallet, and back down to the bottom. FIG. 29a illustrates a pallet 2902 having a wrap and bagging. This double wrapping results in secure and stable pallet for shipment. This second layer also ensures an air tight seal around the pallet. The second layer of wrap around the pallet allows for more rigid cover, and helps to assure uniformity of desired air flow equally to all the pallets.

Figure 29B:
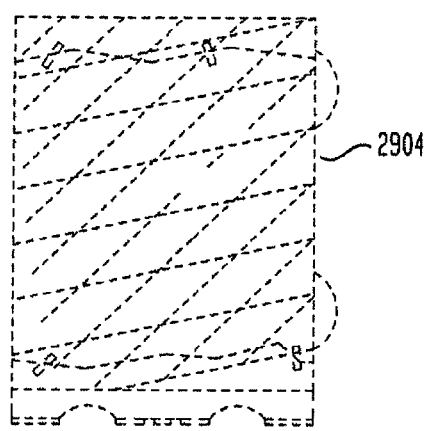
FIG. 29b illustrates a pallet 1104 having wrappings.

In another embodiment, a wrap enclosure without a bag may be utilized. FIG. 29b illustrates a pallet 2904 with wrappings. This wrap may include a top and bottom sheet, for example a stretch wrap that has adhesive properties for adhering to the top and bottom sheet for an airtight seal.

Depending on the products to be packaged, different types of bags and film wraps may be used. For example, there are wraps that do not allow any gas transmission through a film. These types of film are known as Barrier Films. The Barrier Films do not let any CO2 out, or any O2 in.

Other wraps have a microporous membrane. For example, some products inside a pallet may use up O2 and give off CO2 causing gas levels to go out of an acceptable range when not plugged into a control system. The microporous film allows CO2 and O2 to pass through at a specified exchange rate to maintain a proper atmosphere.

The present automatic and continuous monitoring system eliminates the hassle of trying to figure out which plastic bag or wrap to use for the proper gas exchange. It also allows for different respiration rates of the product enclosed, and the impact of temperature, because it continuously monitors and adjusts the atmosphere to maintain the desired set-point of atmosphere.

Figure 30:
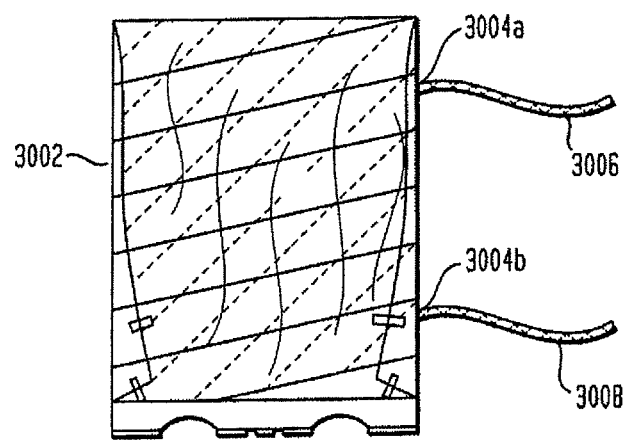
FIG. 30 illustrates a wrapped pallet in a manifold system being connected to injection hoses.

After the pallet is wrapped, the pallet is moved to a manifold system. FIG. 30 illustrates a wrapped pallet 3002 in a manifold system being connected to injection hoses. Small incisions are made in the enclosure at the quick-connect hose fittings 3004a, 3004b to allow the hoses 3006a, 3006b to be attached.

Figure 31:
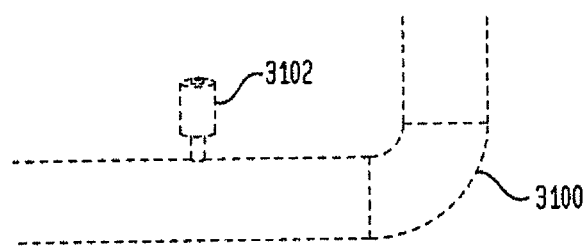
FIG. 31 illustrates a pipe portion of a manifold having a pressure relief valve.

FIG. 31 illustrates a portion of a manifold having a pressure relief valve. The hoses 3106a, 3106b are connected to the manifold 3100 and the gas level may be set on a controller. The controller is then enabled to start regulating the atmosphere. A pressure relief valve 3102 on the manifold 3100 prevents over pressurizing the pallets or equipment. The valve maintains 3102, for example, one to two pounds of positive pressure in the manifold 3100 to ensure that no fresh air leaks in.

Figure 32A:
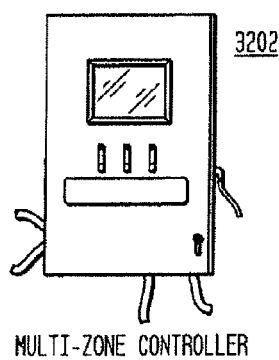
FIG. 32a illustrates a multi-zone controller 1402.
Figure 32B:
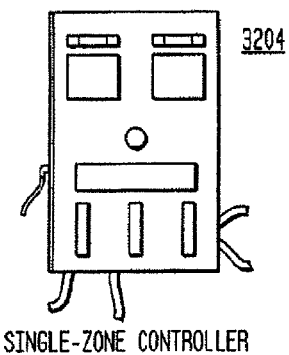
FIG. 32b illustrates a single zone controller 1404.
Figure 33A:
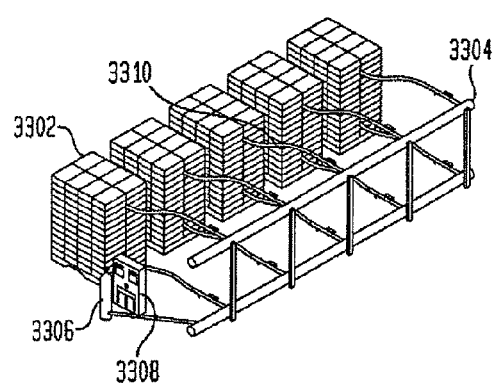
FIGS. 33a-d illustrate a plurality of wrapped pallets connected to a plurality of manifolds.
Figure 33B:
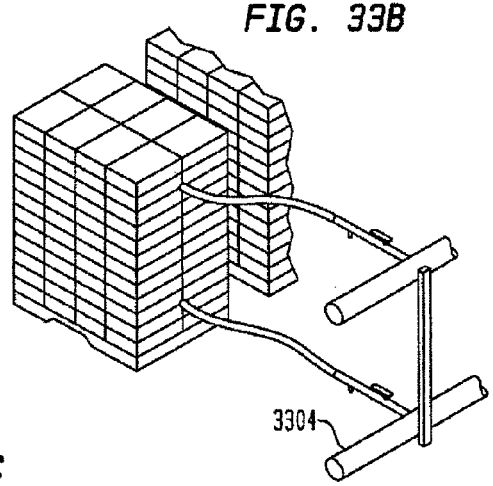
Figure 33C:
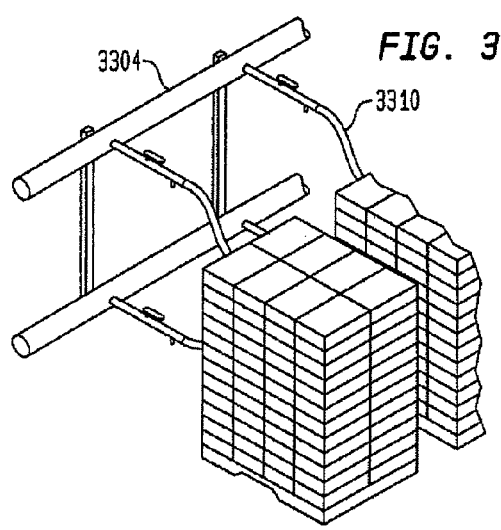
Figure 33D:
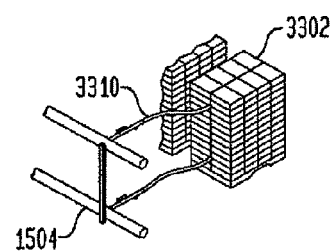

FIG. 32a illustrates a multi-zone controller 3202. FIG. 32b illustrates a single zone controller 3204. In one aspect, a single-zone controller 3204 is used to control one manifold, and adjusts to one atmosphere setting. Similarly, a multi-zone controller 3202 that controls multiple manifolds, each with a different atmosphere setting may be used. The multi-zone controller 3202 may be modular and may include any desired number of combinations of pallets and manifolds, resulting in controlling many different atmosphere settings.

A single zone controller 3204 may include one O2 analyzer/sensor, one CO2 analyzer/sensor, one sample pump, one N2 solenoid, one CO2 solenoid, one fresh air pump with solenoid. The setting may be adjusted by turning 'pots' or potentiometers on the front of the two analyzers. For example, turning clockwise increases the percentage desired, and turning counter-clockwise decreases the percentage. In one embodiment, there are three flow meter controls for the 3 individual gases, for example, nitrogen, carbon dioxide, and fresh air.

The multi-zone controller 3202 may include one or more O2 analyzer/sensors, one or more CO2 analyzer/sensors, on or more sample pumps, one or more N2 solenoids, one or more CO2 solenoids, one or more fresh air pumps with solenoid. The settings, in one embodiment, may be adjusted by touch screen software. The percentage of gas for each of the zones may be selected by inputting the desired amount.

Multiple solenoids may also be attached to the three main solenoids for each of the zones. One or more main solenoids may open along with one or more of the zone solenoids, depending on the gas needed. The multi-zone controller 3202 also may include a modem connected to a Personal Computer ("PC"). The PC may be, for example, located locally or remotely. Accordingly, gas levels may be checked, adjusted, or zones completely shut off or turned on from any laptop or desktop located anywhere. For example, a user may be provided with a name and password to enable the user to log into the controller. This way, a user having the authorization may monitor and change the atmosphere as desired.

FIGS. 33a-d illustrate a plurality of wrapped pallets connected to a plurality of manifolds 3304 of a manifold system. In this example, the manifold system is made up of at least two different sections: a blower section and an add-on section. Each section consists of at least two pallet locations. The blower section incorporates a centrifugal fan or blower to force air through the rest of the manifold sections. The blower section also includes at least the gas inject points and gas sample points. Hoses 3310 are used, for example, for the injecting and sampling. In an exemplary embodiment, the add-on section does not have any fans or inject/sample points. Rather, the add-on section connects to the blower section to expand the manifold systems' pallet capacity. When the manifold system has enough add on sections to meet a customers' needs, an end cap is then connected to the last section to make the manifold system air tight.

As shown in FIG. 33a-d, pallets 3302 having packaged products are connected via hoses 3310 to the manifolds 3304. A controller 3308 controls the amount of gas inside the packaged pallets by controlling the amount of gas released from a gas tank 3306 via the manifolds 3304. As described and shown, the manifolds may be built in modular sections.

In an alternative embodiment of the present application, vacuuming, injection and sampling occurs as follows. A vacuum controlled by a controller vacuums a pallet until a negative pressure is reached to determine at least whether any leaks exist on the wrapped pallet. Once a negative pressure is reached indicating that a leak does not exist, an injection cycle starts, injecting ozone (O3) and nitrogen (N2). The vacuum stays on to help pull the O3 through the pallet and the N2 is used as a carrier for the O3 and to lower the oxygen (O2) level. After the prescribed sanitizer exposure level is reached, the O3 shuts off. In an exemplary embodiment, this is a combination of ppm of O3 over a set amount of time. Alternatively, however, it could be a measured volume and a sensed quantity of O3. Carbon dioxide (CO2) is then injected. The N2 continues to be injected and the vacuum continues to pull the gases through the pallet to create a mixed atmosphere more quickly. A sample line is also running simultaneously to read the CO2 and O2 levels in the pallet in real time. The cycle continues until a CO2 level and O2 level are reached. In an exemplary embodiment, the CO2 level and the O2 level have been set previously using a touch screen associated with the controller.

Alternatively, the sanitizer (O3) is an option and can be chosen to inject or not depending on the needs of the product. Further, depending on the system, when the cycle is complete, an employee can remove the hoses from the pallet or the fingers will be removed automatically. The pallet can then be moved to the next queue to be picked up and shipped. The above-described alternative embodiment for injecting, vacuuming and/or sampling is applicable to each of the exemplary embodiments described in the present application.

In alternative exemplary embodiments of the present application, the methods and systems operable for providing a regulated atmosphere, as described above, may be utilized in conjunction with systems and methods operable to introduce substances within the enclosed area containing products such as perishable and/or fresh products, to facilitate infusion of substances into the products. The substance introduction and/or infusion operations may be performed in association with a cold pasteurization method. Such substance introduction and/or infusion operations may be operable to increase the efficiency of application and/or absorption of the introduced substance or substances to the products.

The infusion and/or substance introduction methods and systems may be utilized in conjunction with the methods and systems described above. The substance introduction may be performed in conjunction with the sealed enclosures of the present application, as described above and including individual consumer packages, or in conjunction with tube cooler systems, containers, chambers, and the like. The sealed enclosures, tube cooler systems, containers, chambers, and the like may be transportable or may be stationary and fixed in position.

The infusion systems and methods may be utilized in conjunction with vacuum cooling techniques. In a vacuum cooling technique, the products, such as perishable and/or fresh produce, may be placed inside a large sealed rigid container or chamber. The container or chamber may include, for instance, a sealed door and/or hatch that may be sealed to provide an airtight enclosure within the container or chamber. The container or chamber may be constructed of any suitable rigid or semi-rigid material, including for instance metal, composite, carbon fiber, plastic, glass, or any other material that allows regulation of pressure or vacuum within an enclosed space.

As will be understood by one skilled in the art, the term "pressure" as used herein may generally refer to an air pressure, and may have a value that is positive or negative. The term "positive pressure" is meant to refer to a value of pressure greater than atmospheric pressure, as resulting for instance when air is pumped into a sealed volume, whereas "negative pressure" is meant to describe a value of pressure less than atmospheric pressure, as resulting for instance when air is evacuated from a sealed volume. The terms "pressure" and "vacuum" may alternatively be used, and may refer to their commonly-understood meanings.

In an exemplary embodiment, for instance, the rigid container may additionally be connected to a vacuum pump system, a temperature monitoring and control system, gauges operable for measuring a pressure within the container or chamber, a fluid evacuation system for removing fluid evaporated from the products, vents and associated valves operable for controlling movement of air and fluid from the container or chamber, and fluid introduction system for applying fluid to the products. The vacuum pump system may include at least one motor, at least one pump, and assorted air passageways operable to connect the vacuum pump system to the container or chamber.

After placing the products in the container or chamber, much or most of the air in the chamber may be evacuated through the use of the vacuum pump system, thereby creating a negative pressure or vacuum condition within the container or chamber. The vacuum causes water to evaporate rapidly from the surface of the products, thereby lowering their temperature. Such vacuum cooling techniques may be particularly effective on products that have a high ratio of surface area to volume, such as leafy greens and lettuce, and products that have overlapping surfaces that may be difficult or impossible to effectively cool with other conventional cooling techniques, such as forced air or hydrocooling techniques.

In an exemplary embodiment, cooling may be effected as described above thorough the evaporation of fluid coating the products at the time of their placement into the container or chamber. Alternatively, additional fluid, such as water, may be applied to the products prior to modification of the pressure, to increase the cooling effect. Such application of fluid may occur before operation of the vacuum system, or may be performed in between successive cycles of operation of the vacuum system.

In an exemplary embodiment, such a vacuum cooling method may be utilized in conjunction with the various exemplary sealed enclosures of the present application, as described above. For instance, in the embodiment as shown in FIG. 11, a sealed enclosure may be coupled to at least one sensor 140 which can receive samples from the sealed enclosure, via a hose 145 coupled to a valve 130 located on the top cap 20. A controller 150 may receive data from the sensor 140, and thereafter implement corrective or responsive action. The controller 150 may be coupled to an automatic valve 160 which may be coupled to a gas tank 170, which may be operable to allow gas from tank 170 to flow through the hose 180 into the sealed enclosure via a second valve 190 coupled to the top cap 20. A third valve 132 may be coupled to the top cap 20 for evacuating the internal area surrounded by the sealed enclosure. A pressure switch 135 may be coupled to the third valve 132, and may be operable to measure the pressure within the sealed enclosure. In an exemplary embodiment, a computer 154 may be linked to the controller 150 via a communications link 152, and may be used to program the controller 150.

In an exemplary embodiment, for instance, the internal area surrounded by the sealed enclosure may be evacuated via the third valve 132, and the quantity and duration of the vacuum or negative pressure produced within the area surrounded by the sealed enclosure may be controlled by the controller 150 and computer 154.

As will be understood by one skilled in the art, in alternative exemplary embodiments, the components and systems described above with respect to the sealed enclosure may be utilized in conjunction with sealed rigid containers or chambers. Additionally, the components and systems described above with respect to the sealed enclosure may be utilized in conjunction with multiple sealed enclosures in an array, as in the exemplary embodiment shown in FIG. 12, and/or in conjunction with an array of rigid sealed containers or chambers. Additionally, the vacuum cooling and/or substance introduction procedures may be performed utilizing a venturi delivery system. Additionally, the components and systems described above with respect to the sealed enclosure may be utilized in conjunction with individual consumer packages including, for example, pre-packaged perishable food products enclosed, for example, in permeable, semi-permeable, or impermeable film material.

Figure 34:
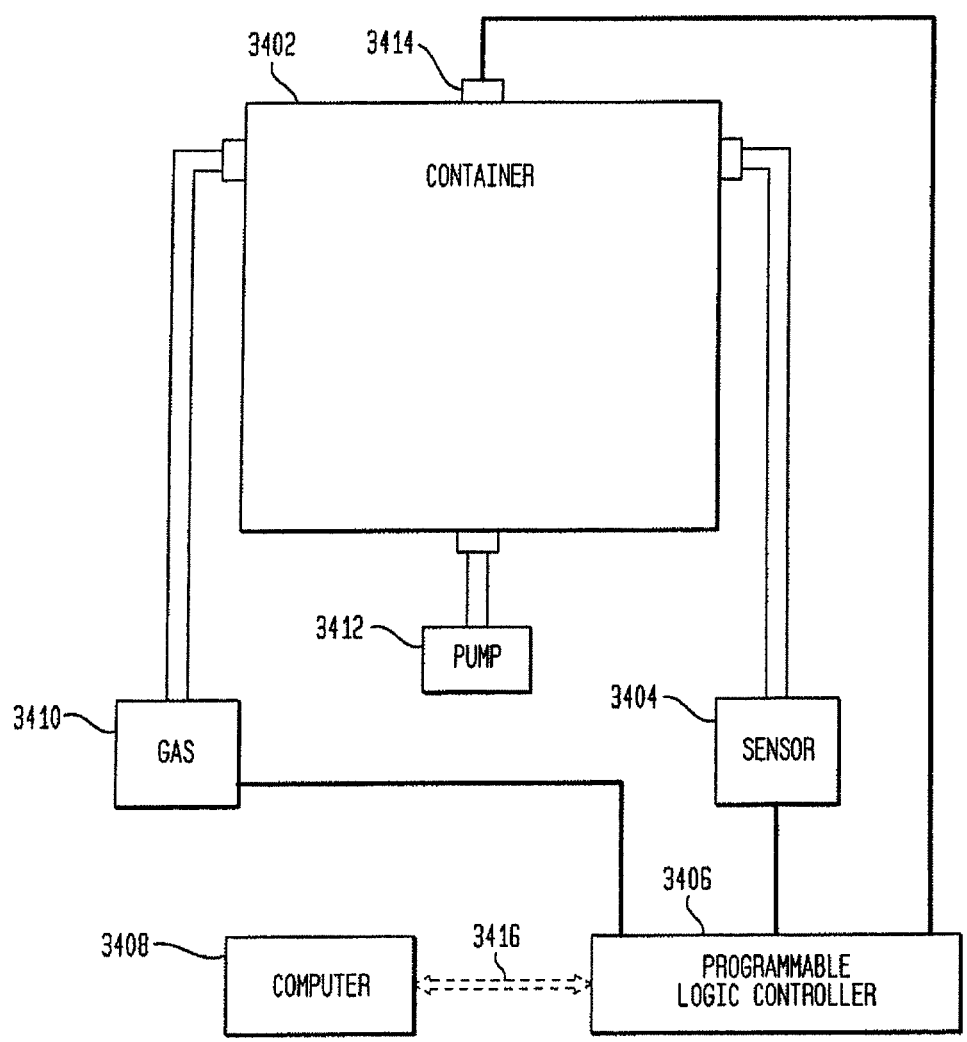
FIG. 34 shows a sensor, a pressure switch, a controller, an optional computer, and a gas source coupled to a rigid container in accordance with an exemplary embodiment of the invention.

In an exemplary embodiment, a rigid container and/or chamber system may be utilized, as shown in FIG. 34. A rigid container 3402 may be connected with a gas source 3410, a sensor 3404 and a pump 3412. A controller 3406, for example a programmable logic controller, may receive data from the sensor 3404. Air may be evacuated and/or introduced into the container by pump 3412, or by valve 3414. An optional computer 3408 may be linked to the controller 3406 via a communications link 3416.

Various substances may be introduced into the area surrounded by the sealed enclosure and/or the sealed rigid containers or chambers at any point before, during, or after the performance of the vacuum cooling procedure described above or variation of the pressure within the sealed enclosure. The substance may include any suitable substance operable to improve the value, safety, shelf-life, flavor, consumability, and or marketability of the products.

The substance may include, for example, a sanitizing substance, a flavoring substance, a preservative substance, a food additive substance, a coating substance, a sealing substance, an essence and/or essential oil substance, a mineral substance, a vitamin substance, a biological substance, and other substances. The sanitizer substance may be in the form of a gas, a liquid, or a vaporized liquid, and may include, for example, ozone, nitrous oxide, inert gases, chlorine in all its forms, hydrogen peroxide, peracetic acid, nitrite and nitrate compounds, iodine, benzoates, propionates, nisin, sulfates, and sorbates or any other suitable gas or gaseous sanitizer. The flavoring substance may include any flavoring that is suitable for application to and/or infusion in the products.

Additionally, the substance may include one or more of coloring substances, food grade acid substances, mineral salt and/or mineral salt solutions, nutritional additives, sweeteners, flavor enhancers, and the like. The extracts, essence and/or essential oil substance may be in the form of a gas, a liquid, or a vaporized liquid, and may include, for example, essential oils from fruits (e.g., strawberries, blueberries, pomegranates, grapes, lemons, grapefruits, oranges, other citrus, cherries, and the like), vegetables, flowers, and other perishable food products, including, for example but not limited to, mint, clove, green tea, rose hips, hibiscus, ginseng, cacao. An essence substance may possess in high degree the predominant qualities of a natural product (as a plant or drug) from which it is extracted (as, for example, by steam distillation or infusion). An essential oil substance may include a concentrated hydrophobic liquid containing volatile aroma compounds of the plant or product from which it was extracted. An essence and/or essential oil substance may be collected from distillate from processing fruit products and may have antimicrobial and/or anti-fungal properties. An exemplary essential oil may include thyme oil (thymol; 2-isopropyl-5-methylphenol, IPMP). The mineral substance may be in the form of a gas, a powder, a liquid, a fluidized compound, a vaporized liquid. The vitamin substance may be in the form of a gas, a powder, a liquid, a fluidized compound, or a vaporized liquid, and may include, for example but not limited to, thiamine hydrochloride, riboflavin (Vitamin B2), niacin, niacinamide, folate or folic acid, beta carotene, potassium iodide, iron or ferrous sulfate, alpha tocopherols, ascorbic acid, Vitamin D, amino acids (L-tryptophan, L-lysine, L-leucine, L-methionine) or any other suitable gas, powder, liquid, or vaporized liquid vitamin substance. The biological substance may be in the form of a gas, powder, micro or nano particle, a fluidized compound, a liquid, or a vaporized liquid, and may include, for example, probiotics such as *Lactobacillus* and *Bifidobacterium* or any other suitable gas, liquid, or vaporized liquid biological substance. Probiotics may include live microorganisms that may confer a health benefit on the host when consumed such as, for example, naturally occurring beneficial or "friendly organisms" which are biologically active against pathogenic and spoilage organisms. In accordance with an embodiment, the biological substance can be added to the sealed enclosure, for example, after a sanitation cycle/sequence has occurred or as part of a stand alone treatment and may provide benefits by, for example, crowding out harmful organisms on the surface of the perishables and/or providing antimicrobial and anti-fungal properties. The substance may include, for example but not limited to, one or more of calcium sulfate, ammonium phosphate, Ascorbic acid, citric acid, sodium benzoate, calcium propionate, sodium erythorbate, sodium nitrite, calcium sorbate, potassium sorbate, BHA, BHT, EDTA, tocopherols (Vitamin E), Citrus Red No. 2, annatto extract, beta-carotene, grape skin extract, cochineal extract or carmine, paprika oleoresin, caramel color, fruit and vegetable juices, saffron, supplements, phages, electrostatically charged particles, or any other suitable gas, liquid, powder, fluidized compound or vaporized liquid substance. Application of electrostatically charged particles to a product within the sealed enclosure may be applicable to a perishable food product or a hybrid seed. Electrostatic spraying and/or coating is defined herein as a manufacturing process that applies charged particles, e.g., powdered particles or an atomized liquid, to a work piece such as, for example, a perishable food product or a hybrid seed.

Alternatively or additionally, substances such as water and/or another suitable liquid may additionally be introduced, either as the introduced substance or in addition to an introduced gaseous and/or vaporized liquid substance, for instance to regulate a water content of the product or to increase efficiency of the cooling and/or substance introduction.

Any of the elements coupled to the sealed enclosure that may allow passage of gas and/or fluid into the sealed enclosure may be utilized to introduce the one or more substances into the area surrounded by the sealed enclosure. In the exemplary embodiment shown in FIG. 11, for example, such elements may include valve 130, second valve 190 which may be coupled to the top cap 20 and connected to the hose 180, and/or third valve 132 coupled to the top cap 20.

In an exemplary embodiment, the vacuum cooling method as described above may be performed any number of times, and the quantity of vacuum and/or pressure, and the duration of maintenance of the vacuum and/or pressure, may be varied. For instance, the pressure within the area surrounded by the sealed enclosure and/or the container or chamber may be cycled, within any suitable combination of vacuum, positive pressure, and atmospheric pressure. The substances may be introduced at any point in any one or more of the cycles. The substances may be introduced, for example, via one or more of the valves and/or hoses described above. Quantities and compositions of the introduced substances may be controlled via any of the sensors, controllers, and/or computers described above. The substances may be introduced either in conjunction with one or more vacuum cooling operations, or independently of the performance of vacuum cooling operations.

In an exemplary embodiment, more than one substance may be introduced, and the plural substances may be introduced serially or simultaneously. Additionally, different substances may be introduced under different conditions, such as a first substance being introduced under a first quantity of vacuum and for a first duration, while a second substance may be introduced under a second quantity of vacuum and for a second duration. Some part of the substances may be evacuated from the area surrounded by the sealed enclosure and/or the container or chamber after introduction, or the substances may be allowed to remain within the sealed enclosure and/or the container or chamber.

In an exemplary embodiment, the pressure and/or vacuum within the sealed enclosure and/or the container or chamber may be cycled. Additionally, the pressure within sealed enclosure and/or the container or chamber may be raised to any value above atmospheric pressure. The introduced substance or substances may be introduced under conditions of vacuum, increased pressure, or atmospheric pressure, in any suitable concentration and for any suitable duration.

In an exemplary embodiment, for instance, pressure within the area surrounded by the sealed enclosure and/or the container or chamber may be modified by a "bump" procedure. In a bump procedure, for example, pressure within the area surrounded sealed enclosure and/or container or chamber may be reduced to a predetermined value, and maintained at that predetermined value for a predetermined period of time. Thereafter, the pressure may be increased, for instance by allowing air to enter the area surrounded sealed enclosure and/or container or chamber, until an internal pressure reaches a second predetermined value, and it may be maintained at the second predetermined value for a second predetermined period of time. During the increase of the pressure through allowance of air into the sealed area, the one or more substances may be introduced. This modification of pressure, with or without the introduction of the substance during the air allowance operation, may be repeated any number of times, utilizing any suitable values for the predetermined pressures and periods of time. Alternatively, the pressure within the area surrounded by the sealed enclosure and/or the container or chamber may be cycled without maintaining the pressure for one or more predetermined periods of time. Concentrations and/or quantities of the introduced substance or substances may be varied, for example based upon a composition and/or characteristic of the product located within the area surrounded by the sealed enclosure and/or the container or chamber.

In an exemplary embodiment, the vacuum cooling and/or substance introduction as described above may be performed at a time of packaging of the product. Alternatively, the vacuum cooling and/or substance introduction may be performed during loading, unloading, transportation, shipping, or storage of the product.

The invention described above provides an improved method and apparatus for transporting perishable and/or atmosphere-sensitive goods. Whereas particular embodiments of the present invention have been described above as examples, it will be appreciated that variations of the details may be made without departing from the scope of the invention. One skilled in the art will appreciate that the present invention can be practiced by other than the disclosed embodiments, all of which are presented in this description for purposes of illustration and not of limitation. It is noted that equivalents of the particular embodiments discussed in this description may practice the invention as well. Therefore, reference should be made to the appended claims rather than the foregoing discussion of preferred examples when assessing the scope of the invention in which exclusive rights are claimed.

We claim:

1. A method for providing a desired atmosphere within a sealed enclosure, wherein at least one product is disposed within the sealed enclosure, the method comprising:
   evacuating air from the sealed enclosure through at least one conduit to create a first predetermined pressure within the sealed enclosure, wherein the evacuating is controlled by a controller programmed with target parameters, set-points and/or operating instructions to provide a desired atmosphere within the sealed enclosure;
   injecting a predetermined quantity of at least one substance into the sealed enclosure through the at least one conduit, wherein the injecting of the substance is controlled by the controller in accordance with the target parameters, set-points and/or operating instructions;
   monitoring the atmosphere inside the sealed enclosure by sampling the atmosphere and comparing at least one sampled parameter to the target parameters, set-points and/or operating instructions; and
   maintaining and/or adjusting the atmosphere inside the sealed enclosure based on the monitoring, wherein the maintaining and/or adjusting of the atmosphere is controlled by the controller in accordance with target parameters, set-points and/or operating instructions.

2. The method of claim 1, further comprising:
   injecting a gas into the sealed enclosure through the at least one conduit to create a second predetermined pressure within the sealed enclosure, wherein the injecting of the gas is controlled by the controller in accordance with the target parameters, set-points and/or operating instructions.

3. The method of claim 2, wherein the injecting the gas facilitates the application to, coating of, absorption into, or infusion into the at least one product by the at least one substance.

4. The method of claim 2, further comprising:
   injecting a second predetermined quantity of the at least one substance into the sealed enclosure through the at least one conduit, wherein the injecting of the second predetermined quantity of the at least one substance is controlled by the controller in accordance with the target parameters, set-points and/or operating instructions.

5. The method of claim 4, further comprising:
   maintaining the predetermined pressure within the sealed enclosure for a first predetermined period of time, wherein the maintaining the predetermined pressure is controlled by the controller in accordance with the target parameters, set-points and/or operating instructions; and
   maintaining the second predetermined pressure within the sealed enclosure for a second predetermined period of time, wherein the maintaining the second predetermined pressure is controlled by the controller in accordance with the target parameters, set-points and/or operating instructions.

6. The method of claim 1, wherein the at least one substance is at least one of a gas, a powder, a micro- or nano-particle, a fluidized compound, a liquid, or a vaporized liquid.

7. The method of claim 1, wherein the at least one substance comprises at least one of a sanitizing substance, a flavoring substance, a preservative substance, a food additive substance, a coating substance, a coloring substance, a nutritional substance, a sealing substance, a mineral substance, a vitamin substance, an essence and/or essential oil substance, or a biological substance.

8. The method of claim 7, wherein the sanitizing substance includes at least one of ozone, chlorine, hydrogen peroxide, nitrous oxide, peracetic acid, nitrite, nitrate compound, iodine, benzoate, propionate, nisin, sulfate, and sorbate.

9. The method of claim 7, wherein the biological substance comprises a probiotic.

10. The method of claim 7, wherein the essence and/or essential oil substance comprises Thymol.

11. The method of claim 1, wherein the substance includes at least one of a food grade acid, a mineral salt, a mineral salt solution, a nutritional additive, a sweetener, or a flavor enhancer.

12. The method of claim 1, wherein the sealed enclosure comprises:
   a pallet with goods stacked on the pallet; and
   wrapping wrapped around the pallet to enclose the pallet of goods.

13. The method of claim 1, wherein the sealed enclosure comprises:
   a pallet with goods stacked on the pallet; and
   a bag covering the pallet of goods.

14. The method of claim 1, wherein the sealed enclosure includes a cooling tube apparatus.

15. The method of claim 1, wherein the sealed enclosure includes a rigid chamber.

16. The method of claim 1, wherein the sealed enclosure is a shipping unit.

17. The method of claim 1, wherein the sealed enclosure is a bin.

18. The method of claim 1, wherein the at least one product is a perishable food product.

19. The method of claim 18, wherein the sealed enclosure comprises an individual consumer package and the at least one product is pre-packaged in the individual consumer package.

20. A method for providing a desired atmosphere within a sealed enclosure, wherein at least one product is disposed within the sealed enclosure, the method comprising:
   evacuating air from the sealed enclosure through at least one conduit to create a first predetermined pressure within the sealed enclosure, wherein the evacuating is controlled by a controller programmed with target parameters, set-points and/or operating instructions to provide a desired atmosphere within the sealed enclosure;
   introducing a predetermined quantity of at least one substance into the sealed enclosure, wherein the introduction of the at least one substance is controlled by the controller in accordance with the target parameters, set-points and/or operating instructions;
   monitoring the atmosphere inside the sealed enclosure by sampling the atmosphere and comparing at least one sampled parameter to the target parameters, set-points and/or operating instructions; and
   maintaining and/or adjusting the atmosphere inside the sealed enclosure based on the monitoring, wherein the maintaining and/or adjusting of the atmosphere is controlled by the controller in accordance with target parameters, set-points and/or operating instructions.

21. The method of claim 20, further comprising:
   sanitizing the at least one product via the at least one substance.

22. The method of claim 20, wherein the at least one substance comprises at least one of a sanitizing substance, a flavoring substance, a preservative substance, a food additive substance, a coating substance, a coloring substance, a nutritional substance, a sealing substance, a mineral substance, a vitamin substance, an essence and/or essential oil substance, or a biological substance.

23. The method of claim 20, wherein the at least one substance includes at least one of ozone, chlorine, hydrogen peroxide, nitrous oxide, peracetic acid, nitrite, nitrate compound, iodine, benzoate, propionate, nisin, sulfate, or sorbate.

24. The method of claim 20, wherein the evacuating facilitates the application to, coating of, absorption into, or infusion into the at least one product by the at least one substance.

\* \* \* \* \*